US011663128B1

(12) United States Patent
Shveidel et al.

(10) Patent No.: US 11,663,128 B1
(45) Date of Patent: May 30, 2023

(54) TECHNIQUES FOR PERFORMING METADATA UPDATES FOR CACHE CONSISTENCY

(71) Applicant: Dell Products L.P., Hopkinton, MA (US)

(72) Inventors: Vladimir Shveidel, Pardes-Hana (IL); Bar David, Rishon Lezion (IL); Michael Litvak, Shoham (IL)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/580,157

(22) Filed: Jan. 20, 2022

(51) Int. Cl.
*G06F 12/0815* (2016.01)
*G06F 9/52* (2006.01)
*G06F 16/23* (2019.01)

(52) U.S. Cl.
CPC .......... *G06F 12/0815* (2013.01); *G06F 9/522* (2013.01); *G06F 16/2343* (2019.01)

(58) Field of Classification Search
None
See application file for complete search history.

(56) References Cited

U.S. PATENT DOCUMENTS

| | | | | |
|---|---|---|---|---|
| 2014/0181827 A1* | 6/2014 | Dice | ...................... | G06F 9/526 718/103 |
| 2017/0351584 A1* | 12/2017 | Griffith | ............... | G06F 16/2358 |
| 2018/0341590 A1* | 11/2018 | Morgenstern | ....... | G06F 11/3466 |
| 2020/0034308 A1* | 1/2020 | Shveidel | ............... | G06F 3/0622 |
| 2022/0091976 A1* | 3/2022 | Soukhman | .......... | G06F 12/0815 |

OTHER PUBLICATIONS

U.S. Appl. No. 17/511,107, filed Oct. 26, 2021, entitled Method and System for Improving Performance During Deduplication, to Michael Litvak, et al.
U.S. Appl. No. 16/260,660, filed Jan. 29, 2019, entitled System and Method for Aggregating Metadata Changes in a Storage System, to Vladimir Shveidel, et al.

* cited by examiner

*Primary Examiner* — Kaushikkumar M Patel
(74) *Attorney, Agent, or Firm* — Muirhead and Saturnelli, LLC

(57) ABSTRACT

In at least one embodiment, processing can include acquiring a spinlock on a cached copy of a metadata (MD) page includes a field stored in two cache lines; updating a register to include an updated value of the field; determining whether a first portion of the updated value of the register is non-zero, wherein two portions of the updated value of the field as stored in the register correspond to the two cache lines; and responsive to determining that the first portion of the updated value of the register is non-zero, performing processing including: storing the first portion of the updated value of the field from the register in the first cache line; and subsequent to performing storing the first portion, storing the second portion of the updated value of the field as stored in the register in the second cache line.

20 Claims, 11 Drawing Sheets

1200

1206

If the current or prior LSB portion as stored in the cache line 1005a prior to update is zero then:
  S1) Write the updated LSB portion from the register to the cache line 1 1005a.
  S2) Issue a full memory barrier instruction to guarantee globally visible cache coherency for the updated LSB portion of cache line 1005a such as across multiple cores of the CPU.
  S3) Write the updated MSB portion from the register to the cache line 2 1005b.
otherwise/else:
  S11) Write the updated MSB portion from the register to the cache line 2 1005b.
  S12) Issue a full memory barrier instruction to guarantee globally visible cache coherency for the updated MSB potion of the cache line 1005b such as across multiple cores of the CPU.
  S13) Write the updated LSB portion from the register to the cache line 1 1005a.

FIG. 7D

TECHNIQUES FOR PERFORMING METADATA UPDATES FOR CACHE CONSISTENCY

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: acquiring a spinlock on a cached copy of a metadata (MD) page stored in a cache, wherein the spinlock prevents concurrent updates of the cached copy of the MD page of the cache, wherein the cached copy of the MD page includes a field stored in two cache lines of the cache; loading a current value of the field of the cached copy of the MD page from the two cache lines to a register; updating the register to include an updated value of the field, wherein a first portion of the register corresponds to a first portion of the updated value of the field and a second portion of the register corresponds to a second portion of the updated value of the field; determining whether the first portion of the updated value of the field as stored in the register is non-zero, wherein the first portion of the updated value of the field as stored in the register corresponds to a first of the two cache lines; and responsive to determining that the first portion of the updated value of the field as stored in the register is non-zero, performing first processing that updates a cached copy of the field as stored in the two cache lines of the cache, the first processing further including: storing the first portion of the updated value of the field from the register in the first cache line; and subsequent to performing said storing the first portion of the first processing, storing the second portion of the updated value of the field as stored in the register in the second cache line.

In at least one embodiment, the first processing can include issuing a full memory barrier instruction after said storing the first portion of the updated value of the field from the register in the first cache line, and prior to said storing the second portion of the updated value of the field as stored in the register in the second cache line. The full memory barrier instruction can guarantee that the first portion of the updated value of the field stored in the first cache line is globally visible and coherent to a reader that reads the first cache line after the full memory barrier instruction is executed.

In at least one embodiment, processing can include: responsive to determining that the first portion of the updated value of the field as stored in the register is not non-zero thereby indicating the first portion of the updated value of the field as stored in the register is zero, performing second processing that updates the cached copy of the field as stored in the two cache lines of the cache, the second processing including: storing the second portion of the updated value of the field from the register in the second cache line; and subsequent to performing said storing the second portion of the second processing, storing the first portion of the updated value of the field as stored in the register in the first cache line. The second processing can further include issuing a full memory barrier instruction after said storing the second portion in said second processing and prior to storing the first portion in said second processing. The full memory barrier instruction can guarantee that the second portion of the updated value of the field stored in the second cache line is globally visible and coherent to a reader that reads the second cache line after the full memory barrier instruction is executed.

In at least one embodiment, processing can include synchronizing access to the cached copy of the MD page stored in a cache, wherein said synchronizing includes allowing a writer to update the cached copy of the MD page stored in the cache while concurrently allowing one or more readers access to read from the cached copy of the MD page stored in the cache, and wherein said synchronizing includes the writer performing said acquiring the spinlock, and wherein said writer performs said loading, said updating the register, said determining, said first processing, and said second processing.

In at least one embodiment, the field can be a reference count denoting a number of references to a data block. Processing can include: receiving a write operation that writes new data to a target logical address; and performing deduplication processing that includes: determining that the new data is a duplicate of content current stored in the data block; incrementing the reference count associated with the data block; and associating the target logical address with the data block so that the target logical address references the data block. Incrementing can increment the reference count to the updated value. Processing can include performing update processing that updates the cached copy of the field as stored in the two cache lines of the cache to the updated value. Update processing can include performing the first processing, and wherein prior to performing update processing that updates the cached copy of the field stored in the two cache lines of the cache to the updated value, at least one of the plurality of cache lines corresponding to the cached copy of the field prior to said update processing is non-zero. After performing update processing that updates the cached copy of the field as stored in the two cache lines of the cache to the updated value, at least one of the plurality of cache lines of the corresponding cached copy of the field can be non-zero. Processing can include: each of the one or more readers acquiring a non-exclusive lock on the MD page stored in the cache; and subsequent to said each reader acquiring the non-exclusive lock on the MD page, said each reader reading the field from the two cache lines of the cached copy of the MD page, wherein said reading is performed while said update processing is updating the cached copy of the field, as stored in the two cache lines of the cache, to the updated value.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 7C and 7D illustrate processing steps that can be performed in at least one embodiment in accordance with the techniques of the present disclosure.

DETAILED DESCRIPTION OF EMBODIMENT(S)

Figure 1:
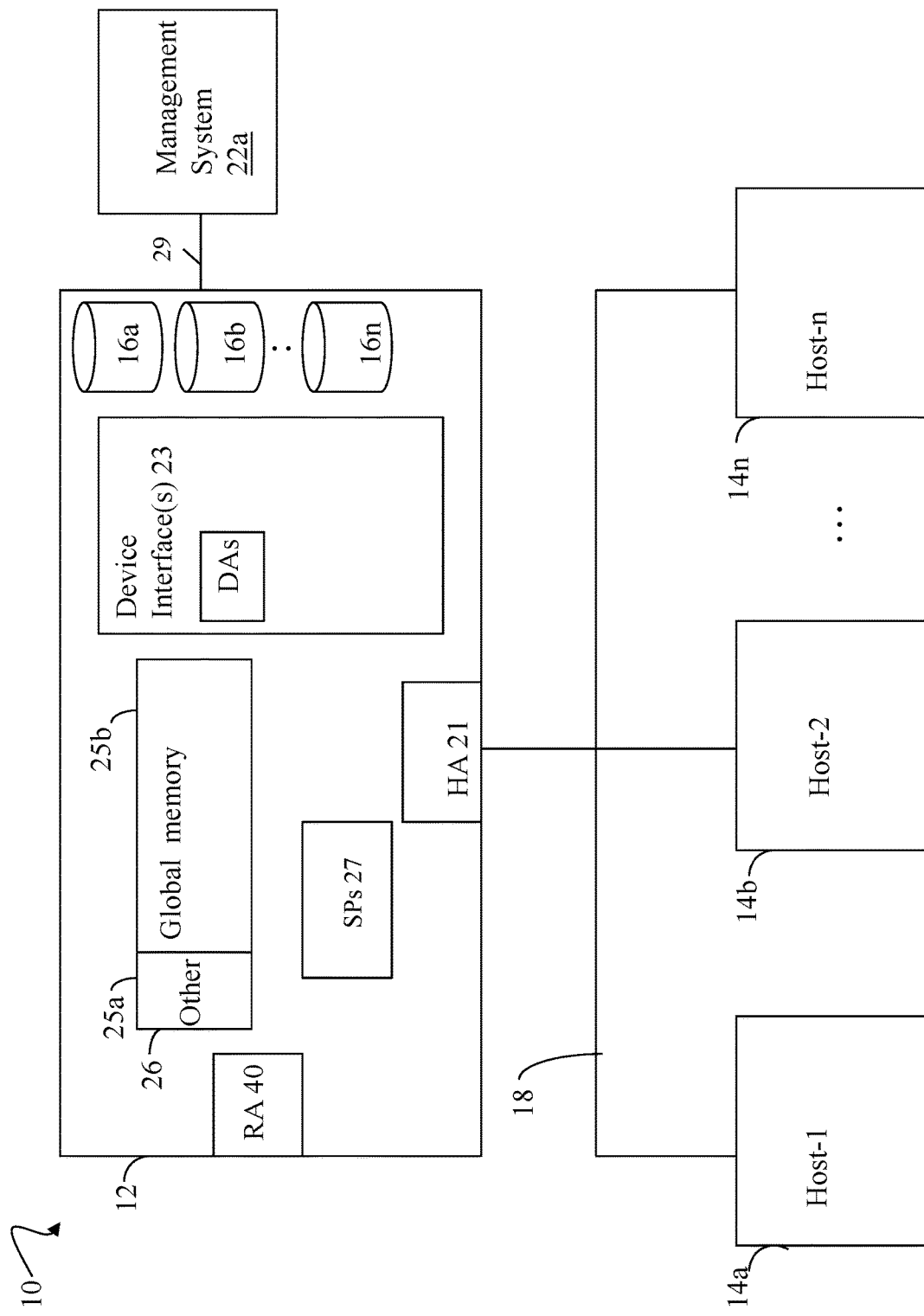
FIG. 1 is an example of components that may be included in a system in accordance with the techniques of the present disclosure.

A data storage system can perform different data services. For example, some data storage systems can perform data deduplication to reduce the non-volatile backend physical storage consumed for storing user data or content. Data deduplication (sometimes referred to simply as deduplication) provides for removing redundant or duplicate copies of data or content by storing a single copy of the user data and having multiple references or pointers to the same stored single copy. For example, the content or user data can be stored in a single data block that can be referenced by multiple logical addresses where the content of the data block is stored at all the multiple logical addresses.

In connection with data deduplication, the data block that includes the user data or content can be associated with a metadata (MD) page, where the MD page can include a reference count denoting the number of references to the data block. The reference count (sometimes referred to as a reference counter) can be updated in connection with deduplication processing. For example, deduplication processing can be performed on new data written to a target logical address by a write I/O operation. Deduplication processing can determine that the new data is a duplicate of existing data stored in a data block. Rather than store another copy of the same data in another data block, deduplication processing can include alternatively having the target logical address reference the single existing copy of the data as stored in the data block. As part of deduplication processing, the reference count associated with the single existing copy of the data block can be incremented as each additional reference to the same data block is made. In a similar manner, the reference count can be decremented as content of a particular logical address is modified or deleted to no longer be considered a duplicate of the single existing copy.

In some existing systems, updating MD such as the reference count can be performed by obtaining an exclusive lock or a write lock providing exclusive access to the MD page including the reference count and also updating the reference count atomically such as using an atomic read-modify-write operation in order to guarantee data consistency. In some applications, the same data or content can be written by multiple writes to many different logical addresses within a relatively short time period. Although deduplication processing can optimize and reduce non-volatile physical storage used to store the duplicate content that is written by the multiple writes, there is also additional contention when processing the multiple writes. In particular, there is additional contention to obtain exclusive access by acquiring the exclusive lock to the same MD page including the reference count that is updated with each additional reference to the same single copy of the written data. The foregoing can cause multiple deduplication transactions processing the multiple writes to queue and block waiting to acquire the same exclusive lock providing exclusive access to the same MD page with the reference count. As a result, the performance of the system can be adversely impacted. Additionally, the adverse impact can be greater, for example, if data deduplication is performed across multiple nodes of the same system where the lock access to the same MD page with the reference count is synchronized across the multiple nodes.

In at least one system, updates to the MD page can be stored in a log, where the logged update is persistently stored and where the logged updated is also stored in an in-memory log structure. In the in-memory log structure in at least one embodiment, each individual update to a particular MD page can be recorded as a separate entry in a bucket of updates associated with the particular MD page. Subsequently, the updates to the MD page as recorded in the log can be flushed and applied to a persistently stored copy of the MD page. Logging the MD updates such as to the reference count of the MD page can result in improved performance. However, when an update to the reference count of the MD page is recorded in the log, any cached copy of the MD page can be invalidated since the cached copy of the MD page is now considered stale and inconsistent with respect to the most current or updated version MD page. As a result, subsequent reads to read any field or item of the MD page can result in a cache miss and can result in subsequently reloading and reconstructing the most current or updated version of the MD page.

Accordingly, described in the following paragraphs are techniques of the present disclosure that can be performed to avoid invalidating the cached copy of the MD page as noted above. The techniques of the present disclosure can be used in connection with updates to the reference count as used in connection with deduplication as well as, more generally, other types of suitable updates. In at least one embodiment, rather than invalidate the cached copy of the MD page including the reference counter, the techniques of the present disclosure can be used in connection with updating the cached copy of the reference counter, and thus updating the cached copy of the MD page including the reference counter.

In accordance with the techniques of the present disclosure in at least one embodiment, the properties and use of the reference count can be such that a majority of the reads of the reference count of the MD page may not require an exact up to date value of the reference count. Rather, a majority of the use cases where the reference count is read may only need to know whether the reference count is zero or non-zero. In such an embodiment, the computation of the exact value of the reference count can be deferred and selectively performed when needed. In such an embodiment, threads or processes reading the reference count of the MD page may also not care about the order in which updates or writes are performed to the reference count. Rather, such threads or processes accessing the reference count for reading can generally want an accurate uncorrupted value of the reference count independent of the order in which updates are made to the reference count.

In at least one embodiment where threads or processes accessing the reference count of the MD page do not care about the order in which updates or writes are performed to the reference count, access to the cached copy of the MD page can be synchronized to allow a single writer to update the reference count of the cached MD page while concurrently allowing multiple readers to access the reference count of the cached MD page. In at least one such an embodiment, the foregoing access can be synchronized (e.g., to allow a single writer to access the cached MD page and also to concurrently allow multiple readers to access the cached MD page) using a shared or non-exclusive lock on the MD page in combination with a spinlock associated with the MD page. The non-exclusive lock on the MD page can generally allow multiple threads or processes to concurrently access the MD page as well as the cached MD page for reading. The non-exclusive lock on the MD page can be used to allow multiple threads concurrent read access to the MD page. Additionally, if a first of the multiple threads now wants to write or update the cached copy of the MD page, the first thread can be required to hold the non-exclusive lock on the MD page and also acquire and hold a dedicated spinlock associated with the cached copy of the MD page. In at least one embodiment, the spinlock can be a node-local spinlock for the MD page. In at least one embodiment, the spinlock can be a dedicated spinlock associated with the node-local cached copy of the MD page where, for example, the multiple readers and the single writer can execute on the same node having the dedicated spinlock associated with the cached copy of the MD page including the reference count. In at least one embodiment where the in-memory MD log includes a bucket of MD updates for the MD page and the bucket can be uniquely associated with the MD page, the spinlock can be a dedicated spinlock associated with the bucket including updates for the MD page. Thus, the first writer thread can hold a non-exclusive or shared lock on the MD page as well as the spinlock on the cached copy of the MD page while other reader threads hold the non-exclusive or shared lock on the MD page. The spinlock can be used to grant the first thread write access to the cached copy of the MD page, exclude other threads from writing to the cached copy of the MD page, and allow other threads holding the non-exclusive or shared lock read access to the cached copy of the MD page concurrent with the first writer thread updating the cached copy of the MD page. Thus the combination of the non-exclusive lock associated with the MD page and the spin lock associated with the cached copy of the MD page can allow for the single writer to have exclusive write access to the cached copy of the MD page while concurrently allowing the other multiple readers to have read access to the cached copy of the MD page. Using the combination of the shared or non-exclusive lock and the spinlock to concurrently allow a single writer and multiple readers to access the same cached copy of the MD page, the single writer can update the reference count of the cached copy of the MD page in a manner that provides for maintaining the data integrity of the reference count by excluding other writers and while simultaneously allowing for inconsistency between the cached value of the reference count and the most up to date version of the reference count (e.g., where the updates to the reference count are allowed to be performed in any order, thereby in an order independent manner, so long as the reference count value read is valid and uncorrupted). In such an embodiment, the spinlock provides the writer with exclusive write access to the reference count of the cached MD page while still concurrently allowing multiple readers read access to the reference count of the cached MD page.

In at least one embodiment, the reference count can be an integer value that can be 0 or more. In at least one embodiment, the reference count of the cached MD page can be stored in multiple cache lines. For example, in at least one embodiment, a cache line can be 64 bits in size and the reference count can have a size generally exceeding 64 bits and thus span two or more cache lines. In such an embodiment, use of atomic instructions can provide for updating only a single cache line atomically but cannot guarantee atomicity of updates made in the aggregate to the multiple cache lines of the reference count of the MD page. For example, assume a writer has updated only one of the cache lines of the reference count but has not yet updated the remaining one or more cache lines of the reference count. If a reader reads the value of the reference count as reflected across the multiple cache lines where only the first of the multiple cache lines has been updated, the reader can reads a corrupted and inaccurate value of the reference count since the multiple cache lines at the single point in time do not represent an accurate, valid, uncorrupted consistent representation of any value of the reference count with respect to the applied updates in any order. Generally, atomic instructions can be used to update a single one of the cache lines atomically (e.g., single read-modify-write performed atomically to update a single cache line) but cannot guarantee atomicity of update across the multiple cache lines.

In at least one embodiment, the techniques of the present disclosure provide for updating the multiple cache lines of the cached copy of the reference count in a defined sequence or order so as to guarantee that the reader will always read a non-zero value for the reference count under the assumption that the reference count has a non-zero value prior to performing the updating and a non-zero value after performing the updating. In this manner, the techniques of the present disclosure can be used to update the multiple cache lines of the reference count in a case where the reference count is a non-zero value both before and after the update. In at least one embodiment, the reference count can be initialized to 1 upon the first or initial reference to the associated data block, where the initialization can be performed by having a thread acquiring and holding an exclusive lock for the MD page to exclude all other access to the MD page and provide the thread with exclusive access to the MD page. Also generally, in other instances where a thread requires an exact value of the reference count and depends on the order in which updates applied the reference count, the thread can be required to first acquire and hold the exclusive lock for the MD page to exclude all other access to the MD page and provide the thread with exclusive access to the MD page. The techniques of the present disclosure can be used for updating the reference count of the cached MD page where threads reading the value of the reference count from the cached copy want the value to be valid, consistent (with respect to a single value stored in multiple cache lines) and uncorrupted but do not require an exact value of the reference count, do not care about the order in which updates are applied, and where the value of the reference count is non-zero both before and after the update. In such an embodiment in instances where the thread cares about the order in which reads and/or write accesses are performed for the reference count, and/or where the reference count has a zero value either before or after the update, it can be the responsibility of the thread performing the update or other operation to acquire and hold the exclusive lock providing the thread with exclusive access to the MD page (e.g., excluding both readers and writers from accessing the MD page while the thread holds the exclusive access such as through use of a write or exclusive lock on the MD page).

Thus in scenarios where the cached reference count is stored in multiple cache lines, accessed by threads that do not care about the order in which updates are applied to the cached reference count, and accessed by threads that want to read a cached value of the reference count that is valid, consistent (with respect to the multiple cache lines) and uncorrupted, the techniques of the present disclosure can be used to provide concurrent access of the cached reference count to multiple readers and a single writer which updates the cached reference count from a current non-zero value to an updated non-zero value (e.g., the cached reference count value is non-zero both before and after the update to performed by the single writer). In at least one embodiment, the techniques of the present disclosure can be used to update the cached reference count rather than invalidate a cached MD page including the reference count to thereby provide for maintaining an up to date version of the cached MD page including the reference count. As a result, the techniques of the present disclosure can provide for reducing the read cache miss rate with respect to the MD page including the reference count, increasing the read cache hit rate with respect to the MD page including the reference count, and generally increasing performance of the data storage system, or more generally, any system in which the techniques of the present disclosure are utilized.

The foregoing and other aspects of the techniques of the present disclosure are described in more detail in the following paragraphs.

Referring to the FIG. 1, shown is an example of an embodiment of a SAN10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2:
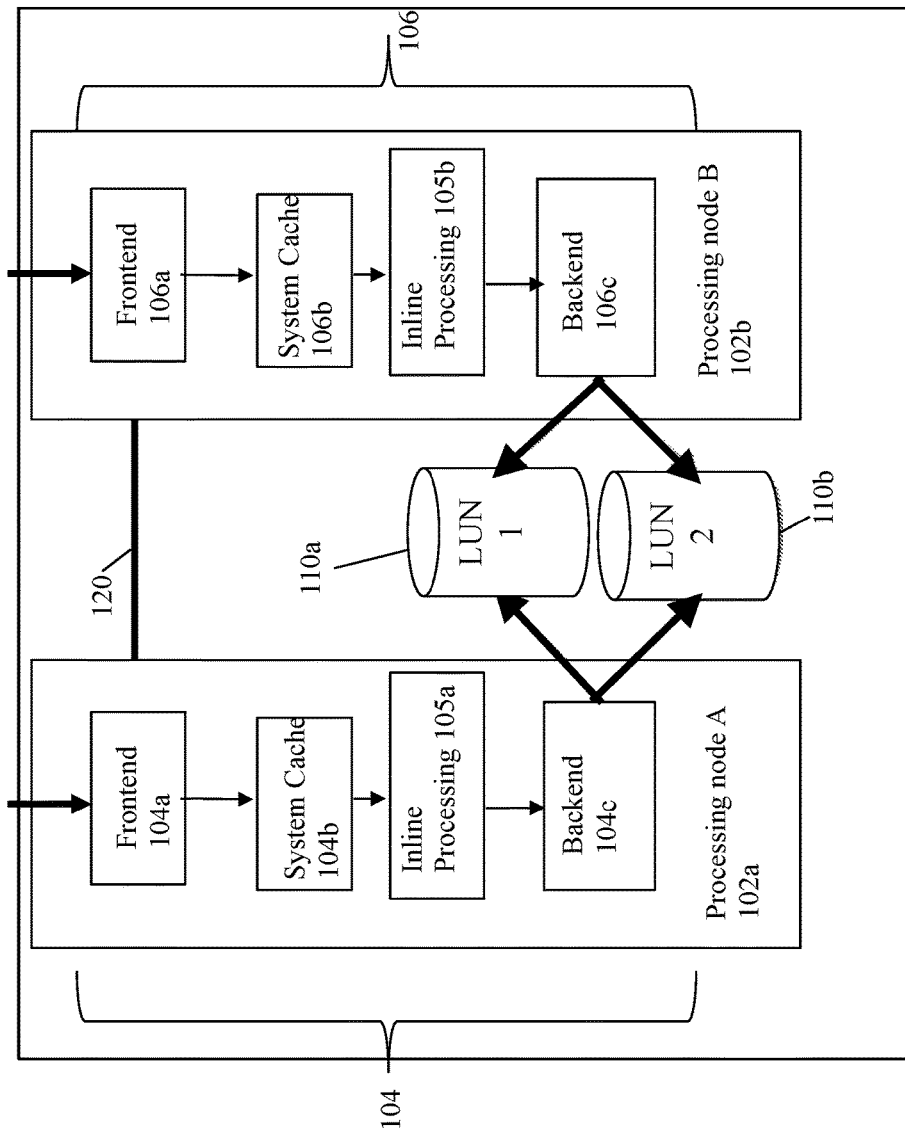
FIG. 2 is an example illustrating the I/O path or data path in connection with processing data in at least one embodiment in accordance with the techniques of the present disclosure.

With reference to the FIG. 2, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes, or more generally I/Os, directed to the LUNs 110a, 110b can be received for processing by either of the nodes 102a and 102b, the example 100 illustrates what can also be referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2, for write operations, latency can be affected by the amount of time taken to store the write data in the log where the write data is visible to both nodes or controllers of the system.

Consistent with other discussion herein, the log file can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein.

The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 3:
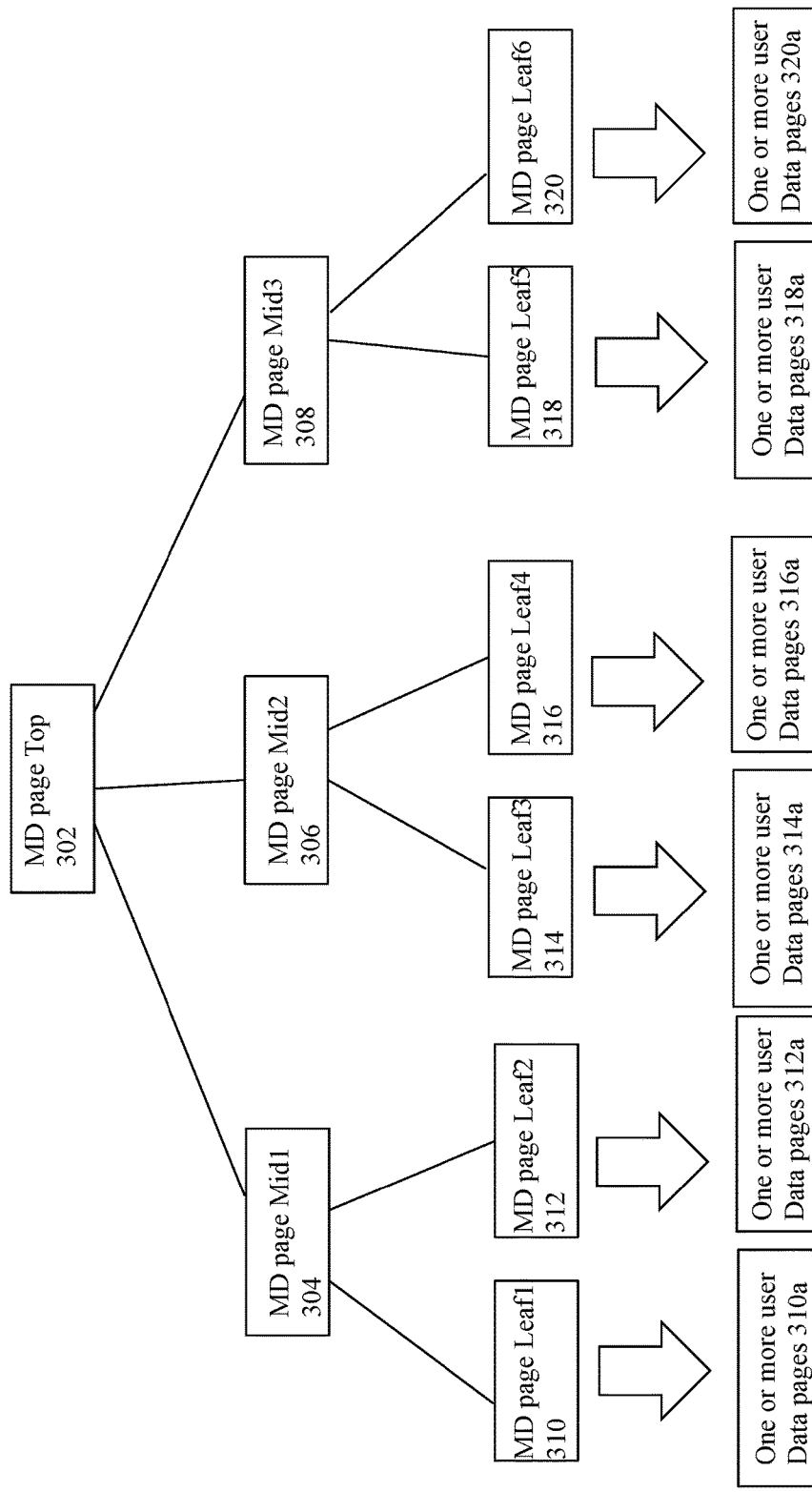
FIGS. 3, 4, 5, and 6 are examples of mapping information in the form of a metadata structure that can be used in connection with mapping logical addresses to physical addresses or storage locations in at least one embodiment in accordance with the techniques of the present disclosure.

In at least one embodiment, the mapping structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 3 as including only 3 levels where each node in the tree can have at most 3 child nodes. Generally, the techniques herein can be used with any layered or hierarchical structure of MD pages.

Referring to FIG. 3, shown is an example 300 of a tree of MD pages that can be used in an embodiment in accordance with the techniques herein. The example 300 includes a tree of MD pages denoting the mapping structure as discussed above with 3 levels—a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312a. In order to access UD page X of 312a, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310a, 312a, 314a, 316a, 318a and 320a include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 3, the data pages 310a, 312a, 314a, 316a, 318a and 320 each include user data stored on particular logical addresses of the LUN A's logical address space. It may be, for example, that element 310a includes user data stored at a first set of LBAs 0-511; and that element 312a includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310a denotes data pages for LBAs 0-511; the element 312a denotes data pages for the LBAs 512-1023; the element 314*a* denotes data pages for LBAs 1024-1535; the element 316*a* denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310*a* denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310*a*.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 4:
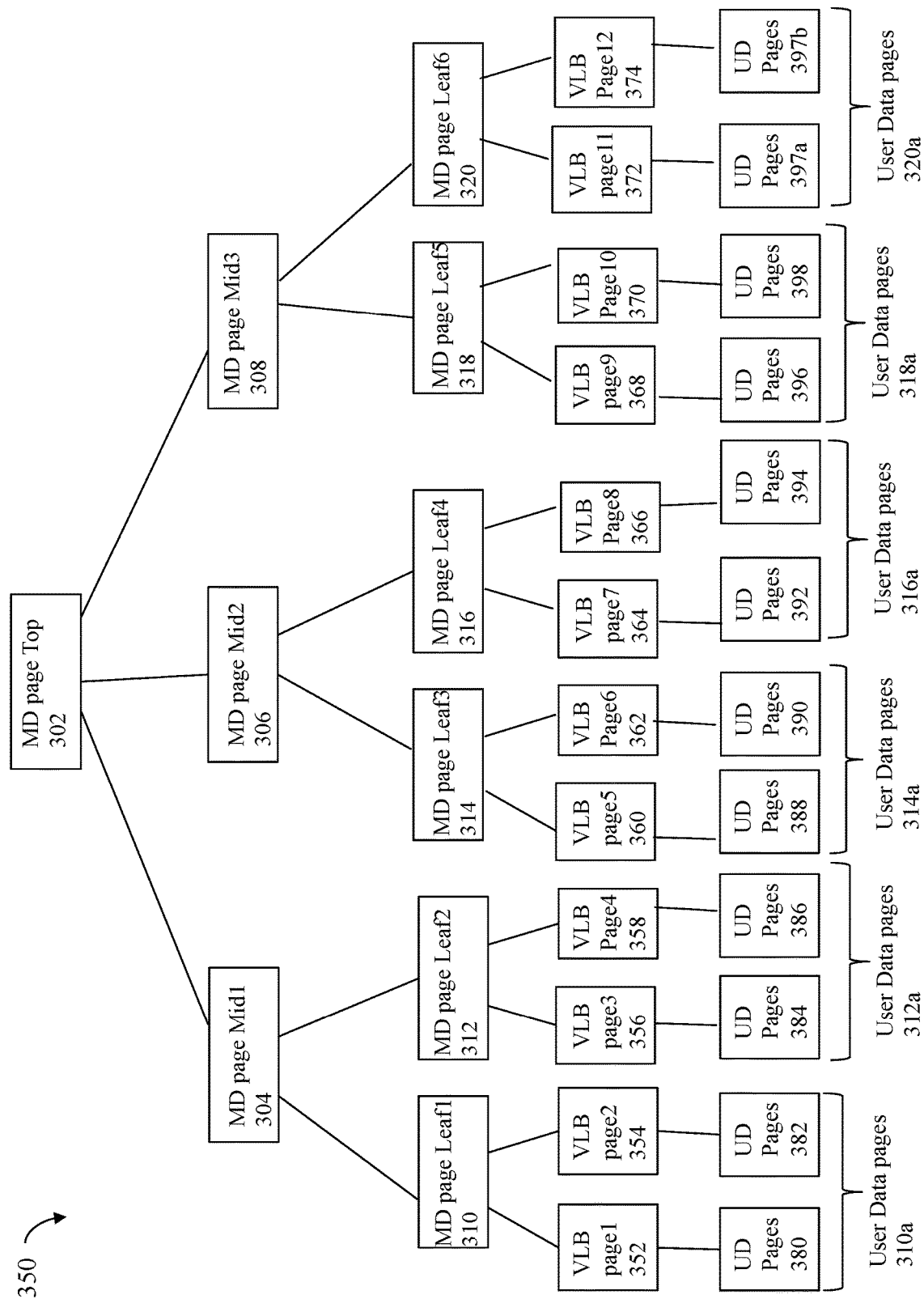

Referring to FIG. 4, shown is a more detailed version of a hierarchical structure used as the mapping structure 108 that can be used in an embodiment in accordance with the techniques of the present disclosure. The structure 350 is similar to the structure 300 as described and illustrated in FIG. 3 with the added difference that more detail is provided regarding the intervening layer of VLB (virtual layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages—MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310*a* of FIG. 3 including data for LBAs 0-511. The UD pages 384 and 386 denote two portions of UD pages corresponding to UD pages 312*a* of FIG. 3 including data for LBAs 512-1023. The UD pages 388 and 390 denote two portions of UD pages corresponding to UD pages 314*a* of FIG. 3 including data for LBAs 1024-1535. The UD pages 392 and 394 denote two portions of UD pages corresponding to UD pages 316*a* of FIG. 3 including data for LBAs 1536-2047. The UD pages 396 and 398 denote two portions of UD pages corresponding to UD pages 318*a* of FIG. 3 including data for LBAs 2048-2559. The UD pages 397*a* and 397*b* denote two portions of UD pages corresponding to UD pages 320*a* of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
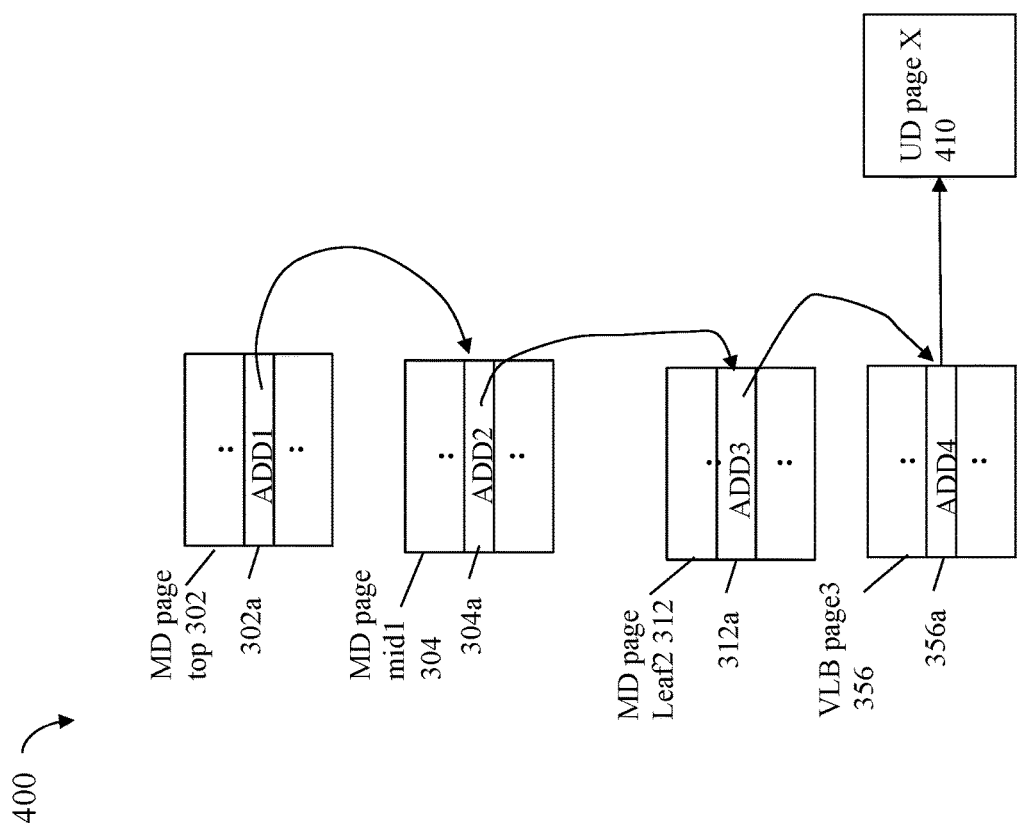

Referring to FIG. 5, shown is a more detailed representation 400 of the MD pages of the sequence traversed to access the UD page X 384 included in the set of UD pages 312*a*. As noted above, the MD page sequence includes MD page 302, MD page 304, MD page 312, and VLB page3 356. In the example 400, MD page top 302 includes an entry or address 302*a* that points to or references the location 304*a* in the MD page mid1 304. In at least one embodiment, the starting entry 302*a* in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302*a* having a pointer, address or reference to an entry in the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302*a*.

If the MD page 302 is already in cache, the cached copy can be used to obtain the address or pointer ADD1 from the location 302a. The address or pointer ADD1 of location 302a can then be used to identify the entry 304a of the particular mid level MD page, such as MD page mid1 304, that is accessed next in the sequence.

Continuing with the example 400, the MD page mid1 304 can be accessed where the location 304a is read to obtain the address or pointer ADD2 from location 304a. The address or pointer ADD2 can then be used to identify the entry 312a of a particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304a. The address or pointer ADD2 identifies location 312a of the MD page leaf 2 312. If the MD page 312 is not already in cache, the on-disk copy of the MD page 312 on a PD can be read to obtain the content of location 312a. The location 312a of the MD page leaf2 312 can be accessed and read to obtain the address or pointer ADD3 from location 312a. The address or pointer ADD3 can then be used to identify a particular entry of a VLB page, such as the entry 356a of the VLB page3 356, that is next accessed in the sequence. Thus, ADD3 can denote the location or address of the entry 356a in the VLB page 3 356.

If the VLB page 356 is not already in cache, the on-disk copy of the VLB page 356 on a PD can be read to obtain the content of location 356a. The location 356a of the VLB page 3 356 can be accessed and read to obtain the address or pointer ADD4 from the location 356a. The address or pointer ADD4 can then be used to identify the particular UD page X 410 where the UD page X can next be read. If the UD page X is not in cache, the on-disk copy of the UD page X can be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

Figure 6:
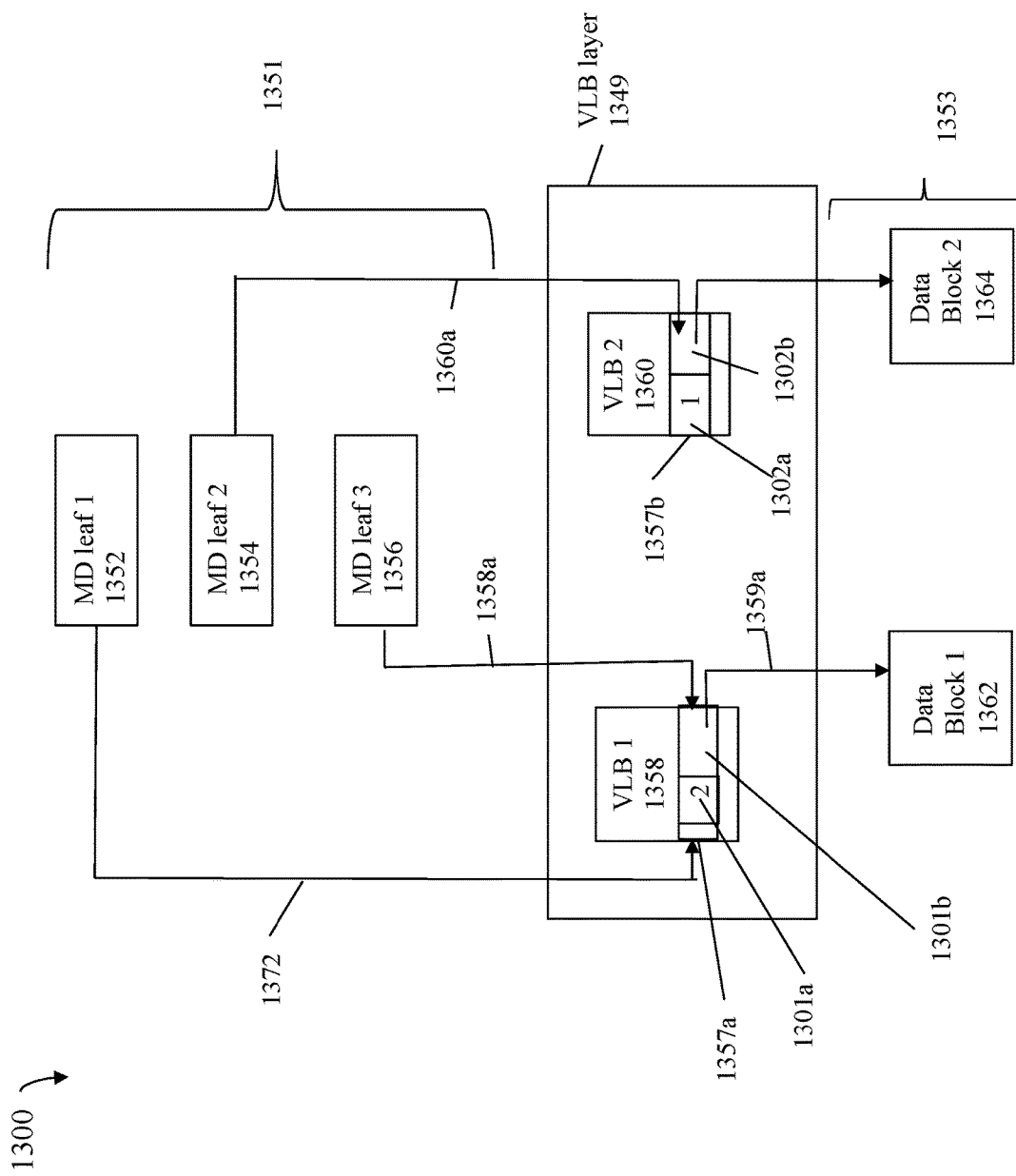

Referring to FIG. 6, shown is an example illustrating in more detail a particular embodiment in which a VLB layer of multiple VLBs is the intervening layer between the MD leaf nodes of the mapping structure 108 and the data blocks. The elements 1352, 1354 and 1356 can denote 3 MD leaf nodes included in a MD leaf layer of a MD mapping structure such as described herein (e.g., in FIGS. 3, 4 and 5). The elements 1358 and 1360 denote 2 VLBs included in the intervening VLB layer 1349 between MD leaf nodes 1351 and data blocks 1353. The elements 1362 and 1364 denote 2 data blocks each storing content such as user data stored at logical addresses. In the example 1300, the MD leaf nodes 1352 and 1356 both indirectly reference the same data block 1362 through the same entry 1357a of the VLB 1358. The two MD leaf nodes 1352 and 1356 both referencing the same data block 1362 indirectly through use of the same VLB entry 1357a can be a mapping resulting from data deduplication processing. In the example 1300, MD leaf node 1354 points to the entry 1357b of the VLB 1360 whereby the entry 1357b of the VLB2 1360 then further references or points to the data block 1364. The data blocks 1362, 1364 can denote user data blocks as described herein.

The element 1358a denotes a pointer to, or address of, the entry 1357a in the VLB 1358 used in connection with obtaining the data block 1362 stored on a particular LUN and LBA of the LUN. The pointer 1358a can be used as the virtual or indirect pointer in connection with obtaining the data block 1362. In at least one embodiment, the VLB 1358 can be a VLB page or node as described herein. Thus, in such an embodiment, the virtual or indirect pointer 1358a can be a pointer to the entry 1357a of the VLB structure 1358, where the entry 1357a can further include fields 1301a and 1301b. The field 1301b can be a pointer to, or address of, the user data block 1362. The field 1301a can be a reference count or counter indicating the number of instances of, or references to, the particular data block 1362 (e.g., data block pointed to by 1301b).

The element 1372 denotes a pointer to, or address of, the entry 1357a in the VLB 1358 used in connection with obtaining the data block 1362 stored on a particular LUN and LBA of the LUN. The pointer 1372 can be used as the virtual or indirect pointer in connection with obtaining the data block 1362. In at least one embodiment, the VLB 1358 can be a VLB page or node as described herein. Thus, in such an embodiment, the virtual or indirect pointer 1372 can be a pointer to the entry 1357a of the VLB structure 1358, where the entry 1357a can further include the fields 1301a and 1301b. The field 1301b can be a pointer to, or address of, the user data block 1362. The field 1301a can be a reference count or counter indicating the number of instances of, or references to, the particular data block 1362 (e.g., data block pointed to by 1301b).

The element 1360a denotes a pointer to, or address of, the entry 1357b in the VLB 1360 used in connection with obtaining the data block 1364 stored on a particular LUN and LBA of the LUN. The pointer 1360a can be used as the virtual or indirect pointer in connection with obtaining the data block 1364. Thus, in such an embodiment, the virtual or indirect pointer 1360a can be a pointer to the entry 1357b of the VLB structure 1360, where the entry 1357b can further include the fields 1302a and 1302b. The field 1302b can be a pointer to, or address of, the user data block 1364. The field 1302a can be a reference count or counter indicating the number of instances of, or references to, the particular data block 1362 (e.g., data block pointed to by 1302b).

In at least one embodiment, the reference count 1301a can be initialized to 0 and used when the associated data block 1362 becomes a candidate for deduplication. As long as the data storage system includes at least one instance of, and thus at least one reference, to the data block 1362, the reference count 1301a will be non-zero. The reference count 1301a becomes zero when all instances of, or references to, the data block 1362 are deleted. In this example, the reference 1301a is 2 indicating that there are 2 instances of the data block 1362 and thus 2 references to the data block 1362. In this case, the are 2 instances of the data block 1362 in stored user data. The instances denoted by the reference count 1301a include all deduplicated instances corresponding to entries of the MDL leaves 1352, 1356 that respectively point 1372, 1358a to the VLB entry 1357a associated with the single copy of the data block 1362.

In at least one embodiment, the reference count 1302a can be initialized to 0 and used when the associated data block 1364 becomes a candidate for deduplication. As long as the data storage system includes at least one instance of, and thus at least one reference, to the data block 1364, the reference count 1302a will be non-zero. The reference count 1302a becomes zero when all instances of, or references to, the data block 1364 are deleted. In this example, the reference 1302a is 1 indicating that there is 1 instances of the data block 1364 and thus 1 reference to the data block 1364. The instances denoted by the reference count 1302a generally include any/all deduplicated instances associated with the single copy of the data block 1364. However, in this example, there is only a single reference to, and single instance of, the data block 1364 in stored user data.

In at least one embodiment, each VLB can be a VLB page or node as described herein including multiple entries, such as 512 entries, where each such VLB entry can include one or more fields of information such as the address or pointer to one of the data blocks such as 1362 or 1364.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 3-6.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 3-6. In at least one embodiment, the MD or mapping information used in connection with stored user data can be stored on non-volatile storage, such as on the BE PDs of the appliance or data storage system. At least some of the MD or mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at physical storage locations on the BE PDs. Additionally, the MD or mapping information corresponding to the logged writes being flushed can also be accordingly updated to reference the physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 3-6.

In at least one embodiment, updates or modifications to the MD pages of the MD or mapping structure described in connection with the FIGS. 3-6 can also similarly be recorded in entries or records of a persistently stored metadata log and then flushed or destaged from the metadata log to persistent BE storage of the BE PDs. In at least one embodiment, the MD pages of the MD or mapping structure such as described in connection with the FIGS. 3-6 can be persistently stored in a MD page store on the BE PDs of the system. In some contexts herein, the copy of a MD page as stored in the MD page store on the BE PDs can also be referred to herein as the on-disk copy of the MD page.

In some existing implementations, when an update is made to a MD page, the entire resulting MD page with the update applied can be stored in the metadata log file. In such implementations, an excessive amount of storage can used in connection with the metadata log file in that each MD page update can include storing an entire updated MD page in the metadata log file. Additionally, excessive amounts of node-local volatile memory of the nodes can be used in connection with node-local cached copies of portions of the metadata log file.

In at least one implementation, many read and write operations performed with respect to a MD page may only need, respectively, to read or update one field or value of the MD page. For example, a MD update to a MD page can require only updating a relatively small number of bytes, such as 4 bytes or 8 bytes, of a much larger MD page, such as a 4K byte MD page. However, as noted above, existing workflows for some implementations to perform reads and writes to the MD page can include loading the entire MD page into the cache or volatile memory of a node, if the MD page is not already in the cache or volatile memory of the node.

In this manner, existing implementations and workflows such as noted above can consume an excessive of amount of system resources, such as memory and CPU or processor execution time, resulting in performance degradation.

To improve upon the foregoing, a metadata log architecture can be used which includes a metadata log where updates to MD pages are recorded using only the changes, updates or "deltas" made to the MD pages. For example, many updates to a MD page can be an update or write of a relatively small number of bytes, such as 4 bytes or 8 bytes, of a much larger MD page, such as a 4K byte MD page.

In at least one embodiment in accordance with the techniques of the present disclosure, the metadata updates, changed content, changes or "deltas" made to MD pages (rather than complete updated MD pages) can be recorded in a metadata log as stored on a log tier of non-volatile memory. Additionally, in at least one embodiment in accordance with the techniques of the present disclosure, the metadata updates, changes or deltas made to at least some of the MD pages can also be stored in local volatile memories of the nodes of the system. The node local in-memory copy of the metadata changes, updates or deltas made to MD pages as stored on each of the nodes can also sometimes be referred to herein as the in-memory log, in-memory delta log or in-memory metadata log used by each node in connection with performing processing in accordance with the techniques of the present disclosure.

In at least one embodiment, each metadata update, change or delta made to a MD page may be expressed in the form of a tuple represented as (LI, EI, T, V) where:

LI denotes the logical index of the MD page. The LI can be a unique index of the MD page that is updated. The LI can be used to uniquely identify the MD page in the MD or mapping structure such as described elsewhere herein (e.g., FIGS. 3-6).

EI denotes the entry index denoting a particular entry, offset or location in the MD page denoted by LI.

T denotes the type of metadata update. For example, in at least one embodiment there can be multiple predefined types or allowable values for T. For example, the predefined types or values for T may include one or more of: IDP denoting an update to an address or indirect pointer used to reference a data block (e.g., the indirect pointer may be point to, or be the address of, a VLB entry that further includes an address of, or pointer to, the data block containing user data); INCREF denoting an update to increment by 1 a reference count of a VLB entry associated with a data block containing content that may be stored at one or more logical addresses; DECREF denoting an update to decrement by 1 a reference count of a VLB entry associated with a data block containing content that may be stored at one or more logical addresses. Generally, an embodiment can include any suitable number of predefined types that may vary with the supported metadata updates or changes.

V denotes the updated value to be stored.

It should be noted that the particular value of T denoting a particular type can also denote the size of the data payload V or updated value V of the tuple. For example, a type for T denoting an address can indicate that the size of V is the size or number of bytes or bits of an address or pointer. As another example, a type of T denoting an integer count or counter can indicate that the size of V is the size of an integer, such as 32 bits. In some instances, the value of the type T can imply performing an operation such as increment a counter by 1, or decrement a counter by 1, as noted above. In such cases and in some embodiments, the value for V of the tuple can be implied and omitted when T indicates to perform an increment or decrement operation of a field since such an increase or decrease can be with respect to a current or existing value of the counter.

In at least one embodiment, the metadata changes, updates or deltas made to MD pages as recorded in the in-memory metadata logs of the nodes can be in the form of tuples. In at least one embodiment, the metadata changes, updates or deltas made to MD pages as recorded in the metadata log stored on NVRAM can also be in the form of tuples.

Figure 7A:
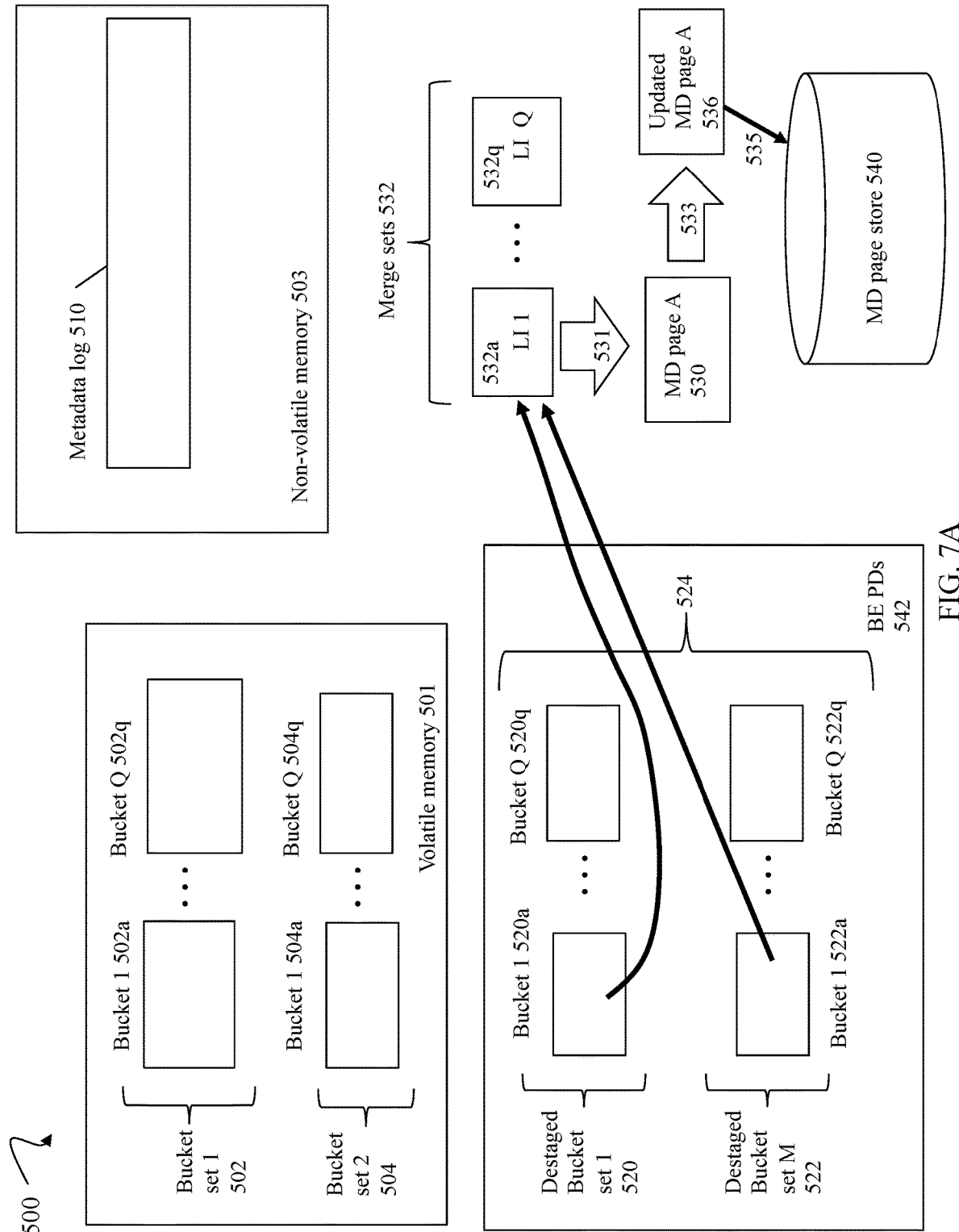
FIG. 7A is an example illustrating structures and associated data flow in at least one embodiment in accordance with the techniques of the present disclosure.

Referring to FIG. 7A, shown is an example 500 illustrating structures and associated data flow in at least one embodiment in accordance with the techniques of the present disclosure.

The example 500 includes volatile memory 501, non-volatile memory 503 and non-volatile storage on the BE PDs 542. The volatile memory 501 can denote a volatile memory as included in each node of the appliance or system which includes node local in-memory structures and cached data that can be used in connection with the techniques herein. In particular, the volatile memory 501 includes bucket sets 502, 504 of logged metadata changes, updates or deltas. The non-volatile memory (e.g., NVRAM) 503 includes the metadata log 510 of metadata updates, changes or deltas. Consistent with other discussion herein, the non-volatile memory 503 can be accessible to both nodes of the system.

Collectively, the structures or bucket sets 502, 504 can denote the in-memory metadata log or in-memory delta log including the recorded metadata updates or deltas to MD pages for a particular node. Thus, each node in a dual node appliance can include an instance of the volatile memory 501 and associated structures or bucket sets 502, 504.

In at least one embodiment in accordance with the techniques herein, metadata changes, updates or "deltas" made to MD pages can be recorded and stored in a volatile memory structure in the volatile memory 501 of each node of the system. In this manner, an individual write or update to a MD page can be recorded as a single metadata update or entry in the volatile memory structure. For example, a write that updates only a 4 byte or 8 byte field of a 4K byte MD page can be recorded in the volatile memory structure as a single metadata update. Each metadata update can be represented as a tuple as discussed elsewhere herein in more detail. In at least one embodiment, each tuple can be relatively small in comparison to the size of each MD page.

The volatile memory 501 of each node can include volatile memory structures 502, 504. In at least one embodiment, the structures 502, 504 can denote two bucket sets 502, 504 where at any point in time, one of the two buckets sets 502, 504 can be designated as the active set and the remaining bucket set can be designated as the destaging or inactive set. Each metadata update to a MD page can be added to a corresponding one of the buckets of the active bucket set that is uniquely associated with the MD page. For example at a first point in time, the bucket set 1 502 can be active and the bucket set 2 504 can be inactive, where received metadata updates are stored in the bucket set 502. As described in more detail in the following paragraphs, the roles of active and inactive or destaging can be alternated or switched between the two bucket sets 502, 504 in a continuous manner as the currently active set is deemed full or ready for destaging to the BE PDs 542.

The bucket set 1 502 includes the buckets 502a-502q, and the bucket set 2 504 includes the buckets 504a-504q, where there are "q" metadata pages. In each of the bucket sets 502, 504, each bucket can correspond uniquely to a different MD page. The metadata updates of a particular bucket are the recorded metadata updates to the MD page associated with the particular bucket of each bucket set. For example, MD page A can be uniquely associated with, and mapped to, the first buckets 502a, 504a, respectively, in each of the bucket sets 502, 504. In this manner, the bucket 1 502a includes the metadata updates made to the MD page A when the bucket set 502 is the active set; and the bucket 1 504a includes the metadata updates made to the MD page A when the bucket set 504 is the active set.

Each of the bucket sets 502, 504 in at least one embodiment can be further organized as a hash table of buckets where each MD page is mapped to a particular bucket using a hash function. The hash function can map the logical index (LI) uniquely identifying a MD page to a corresponding bucket of metadata updates for the MD page. In at least one embodiment, each of the bucket sets 502, 504 can denote a hash table of buckets implemented as an array, where the hash value HV1 of the LI of a MD page denotes the index of the array and the bucket associated with the MD page. Within each bucket associated with a MD page, the metadata updates can be sorted in a time order, from oldest to newest, based on when the metadata updates are received in the system. In at least one embodiment, each bucket (e.g., 502a) of metadata updates for a MD page can be organized in a binary tree. The metadata updates can be represented as nodes or entries in the binary tree. The metadata updates or nodes of the binary tree can be sorted, at least in part, based on the time order of when the metadata updates are received by the system. The increasing time order can indicate the order in which the metadata updates or changes are applied to the MD page associated with the bucket or binary tree.

More generally, an embodiment in accordance with the techniques herein can use any suitable volatile memory structure(s) and organization to store the metadata updates, changes or deltas to the MD pages.

In at least one embodiment, when a new metadata update U1 is made to a MD page, the metadata update U1 can be represented as a tuple. The metadata update U1 can be inserted into the active bucket set as follows. The hash function H is used to calculate a hash value HV of the LI of the MD page (e.g., H(LI)=HV). The HV can denote the bucket uniquely associated with the MD page being updated. For example, assume the bucket set 502 is the active set and assume that the MD page A is being updated with the new metadata update U1. The MD page A can have an LI that generates a hash value=1 mapping to the first bucket, bucket 1 502a, of the bucket set 502. The bucket 502a can be a binary tree including metadata updates to the MD page A. The metadata update U1 can be inserted into the sorted binary tree of 502a based, at least in part, on when the metadata change U1 was received.

Consistent with other discussion herein, the volatile memory 501 can include 2 sets of buckets 502, 504. At a first point in time T1, a first set of buckets, such as 502, can be designated as the active set and the second set of buckets 504 can be designated as the inactive set of buckets. Consistent with other discussion herein, each bucket in a set includes the metadata updates or changes for a particular one of the MD pages associated with the bucket. Thus, metadata changes received for a particular MD page are located in the bucket associated with the MD page. The role assignments of active and inactive can be continuously switched between the two bucket sets 502, 504 of a node at subsequent points in time as the currently designated active set becomes full. In at least one embodiment, the role assignment switching between the two sets of buckets can be performed when at least one bucket in the active set becomes full, or more generally reaches a predefined maximum size limit. In some implementations, each data container can have a predefined data limit before the data container is considered "full". For example, metadata updates to a MD page associated with each bucket can be written to the BE PDs of the system as a separate page (e.g., 4 KB). In this example, the page size can determine the predefined data limit of a bucket. In other words, once a bucket includes a page-worth of metadata changes, processing can determine that the data container is "full".

To further illustrate, at a second point in time T2 subsequent to T1, the first set of buckets 502 currently designated as the active set becomes full and, in response, the second set of buckets 504 can be assigned as the active set and the first set 502 can be assigned as the inactive set. At the second point in time, metadata updates can be destaged from the inactive first set of buckets 502 in volatile memory to the BE PDs 542 such as, for example, in the first phase of destaging as mentioned elsewhere herein. New metadata updates received subsequent to T2 while the bucket set 502 is inactive or destaged are stored in the set of buckets 504 designated as the currently active set of buckets. At a third point in time T3 subsequent to T2, the second set of buckets 504 currently designated as the active set becomes full, and in response, the first set of buckets 502 can be assigned as the active set and the second set 504 assigned as the inactive set. Metadata updates can now be destaged from the second set 504 designated as the inactive set while subsequent metadata updates are now stored in the first set 502 designated as the active set. The foregoing switching of roles of active and inactive between the two sets of buckets 502, 504 can be repeatedly performed in an ongoing manner where new metadata updates are stored in the currently designated active set and where metadata updates of the other currently designated inactive set are destaged from the volatile memory 501 to the BE PDs 542.

In at least one embodiment in accordance with the techniques herein, one or more sets of the metadata updates for the MD pages can be destaged in a first phase of destaging from the volatile memory 501 to the BE PDs 542 providing non-volatile backend storage. As mentioned above, metadata updates can be destaged in the first phase of destaging from the particular one of the bucket sets 502, 504 designated as the inactive set. Over time, multiple bucket sets 524 can be destaged from the volatile memory 501 (e.g., of each of the nodes) to the BE PDs 542 in the first phase of destaging. The destaged bucket sets 524 in this example include M destaged bucket sets indicating that M sets of Q buckets have been destaged from the volatile memory 501 (e.g., as included in each of the nodes) to the BE PDs 542, where the M destaged bucket sets 524 are awaiting further processing in the subsequent second phase of destaging.

The destaged bucket sets 524 of metadata updates for the MD pages can be stored and organized on the BE PDs in any suitable structures and organization. For example, each destaged bucket set of metadata updates for MD pages can be organized into buckets of bucket pages, where each bucket can correspond or map uniquely to a single MD page. For example, the bucket 1 520a of the destaged bucket set 1 520 can include metadata updates for the MD page A as noted above. The bucket (e.g., 520a) of one or more bucket pages associated with a single MD page (e.g., MD page A) can include one or more metadata changes made to the MD page, where the metadata changes can be represented as tuples in the volatile memory structure (e.g., bucket sets 502, 504) of the volatile memory 501. The metadata changes in each bucket, such as 520a, of 524 can be sorted based on insertion time and therefore denote the sorted increasing time order in which the metadata changes are applied to the MD page. In at least one embodiment, the bucket pages of each bucket of 524 can be organized as a list rather than, for example, a binary tree structure as described above in connection with the organization of metadata updates in the volatile memory 501. In at least one embodiment as denoted by the element 524, there can be multiple sets of metadata updates for MD pages stored on the BE PDs 542, where each of the multiple destaged bucket sets of 524 can denote a set of metadata updates destaged from the buckets sets 502, 504 of volatile memory at a different point in time.

In a second phase of destaging, metadata changes, updates or "deltas" from the multiple destaged bucket sets 524 made to the same single MD page can be aggregated and combined into a working set (sometimes referred to as a data container working set) of metadata updates for the MD page. The second phase of destaging can aggregate and combine the metadata updates for each MD page across the multiple destaged sets (520, 522) of metadata updates as stored on the BE PDs in the first phase of destaging. Thus a working set or merge set of metadata updates for a single MD page can denote aggregated metadata updates to the MD page, where the metadata updates can be located in the multiple destaged sets of updates 524 stored on the BE PDs 542. An existing or current version of the MD page can be read from the BE PDs. The working set of metadata changes for the MD page can be applied to, or combined with, the current MD page to thereby result in an updated version of the MD page. The updated MD page can then be persistently stored on the BE PDs replacing the prior current or existing version of the MD page.

To further illustrate, consider the MD page A 530 having an associated LI=1 that maps to the first bucket (e.g., 520a, 522a) in each of the M destaged bucket sets of 524. The second phase of destaging can aggregate and combine the metadata updates for the MD page A 530 from the first buckets (e.g., 520a, 522a) across the multiple M destaged sets 524 of metadata updates as stored on the BE PDs 542 in the first phase of destaging. The element 532a can denote the merge set of aggregated updates from the first buckets 520a, 522a of the destaged sets 524 for the MD page A 530. Thus the merge set or working set 532a of metadata updates for the MD page 530 can denote aggregated metadata updates to the MD page, where the metadata updates can be located in the multiple destaged sets 524 of updates stored on the BE PDs. An existing or current version 530 of the MD page can be read from the BE PDs. The merge set or working set 532a of metadata changes for the MD page A can be applied to (531) the current MD page A 530 to thereby generate (533) an updated version of the MD page A 536. The updated MD page 536 can then be persistently stored (535) on the MD page store 540 of the BE PDs replacing the prior current or existing version of the MD page 530.

Generally, the element 532 denotes the merge sets of aggregated metadata updates for all the MD pages. In this example, there are Q MD pages, where each of the Q MD pages can be uniquely associated with a corresponding one of the merge sets 532*a-q* based on the LI of each of the Q MD pages.

In at least one embodiment in accordance with the techniques herein, the metadata changes, updates or deltas can be recorded in the metadata log 510 The metadata log 510 can be stored in the non-volatile memory 503, such as non-volatile Random Access Memory (NVRAM). In some implementations, the metadata log 510 can store metadata updates in time order (e.g., sorted oldest to newest). In some implementations, the metadata log 510 can be used to recover and reconstruct in-memory structures, such as structures of the volatile memories of the nodes of the data storage system. The metadata log 510 can be used to perform such recovery or reconstruction of the in-memory structures, for example, in response to a failure of the volatile memory of a node, or in response to a restart or reboot of a node or data storage system.

In some implementations and in response to destaging or writing the one or more metadata changes from the volatile memory 501 to the BE PDs 542 in the first phase of destaging, processing can be performed to release or free the corresponding part of the metadata log storing the destaged metadata changes. In at least one embodiment, the persisted metadata log 510 can be implemented as a ring buffer. Ring buffers are generally known in the art. A ring buffer can be represented as a logical ring of records or entries. The ring buffer can be maintained using pointers, such as a head pointer and a tail pointer, where new entries of the ring can always be allocated from the head and space reclamation can always be done from the tail. When an entry at the tail is flushed or destaged, the entry can be freed and thus reclaimed for reuse. The tail can be advanced as entries are flushed. In a similar manner, as entries are allocated, the head pointer is advanced. In at least one embodiment, entries from the metadata log 510 can be reclaimed as corresponding entries denoting the same metadata changes or deltas are destaged in the first phase of destaging from the in-memory metadata logs of the nodes (e.g., volatile memories 501 of the nodes) to the BE PDs 542. In such an embodiment, the destaging of metadata updates or changes as recorded in the in-memory metadata logs of the nodes can be synchronized with reclaiming corresponding entries from the persisted metadata log 510.

In at least one embodiment, when a single bucket set from volatile memory is destaged, corresponding entries from the persisted metadata log 510 stored in NVM 503 can also be reclaimed. In at least one embodiment, the destaging of an in-memory metadata log structure (e.g., such as a single bucket set 502) and reclaiming corresponding entries from the persisted metadata log 510 stored in NVM can be done atomically. In at least one embodiment, the metadata log 510 stored on the NVM can be a ring buffer as noted above where new metadata log 510 entries are added to the head and removed from the tail. In such an embodiment, the corresponding entries of the metadata log 510 can be reclaimed by moving the tail of the ring buffer to free the corresponding entries of the ring buffer. In such an embodiment, synchronization between the in-memory metadata logs of the nodes and the persisted metadata log 510 can be maintained so that flushing or destaging an in-memory metadata log in the first phase and reclaiming corresponding entries in the persisted metadata log 510 are done atomically. In particular in at least one embodiment, reinitializing or resetting the in-memory metadata log which has been destaged (e.g., in the first phase) can be performed atomically with movement of the tail of the metadata log 510 to reclaim corresponding entries for the destaged entries of the in-memory metadata log. It should be noted that in embodiments where a single entry of the persisted metadata log can be referenced across multiple bucket sets, the entry of the persisted metadata log cannot be reclaimed until all such references across the multiple bucket sets have been destaged or flushed in the first phase from volatile memory to the BE PDs 542.

A data storage system can perform different data services such as data deduplication discussed above to remove redundant or duplicate copies of data or content by storing a single copy of the user data and having multiple references or pointers to the same stored single copy. For example, the content or user data can be stored in a single data block that can be referenced by multiple logical addresses where the content of the data block is stored at all the multiple logical addresses.

In connection with data deduplication, the data block that includes the user data or content can be associated with a MD page, where the MD page can include a reference count denoting the number of references to the data block. For example reference is made back to FIG. 6 and discussion above regarding FIG. 6. In at least one embodiment using the MD structures as described, for example, in connection with FIGS. 3, 4, 5, 6 and 7A, the reference count associated with a data block can be included in an entry of a VLB page associated with the data block. For example with reference to FIG. 6, the VLB entry 1357*a* includes a field 1301*a* with the reference count=2 for the associated data block 1362; and the VLB entry 1357*b* includes a field 1301*a* with the reference count=1 for the associated data block 1364.

The reference count such as of the VLB entries 1357*a*, 1357*b*, can be updated in connection with deduplication processing. For example, deduplication processing can be performed on new data written to a target logical address by a write I/O operation. Deduplication processing can determine that the new data is a duplicate of existing data stored in a data block. Rather than store another copy of the same data in another data block, deduplication processing can include alternatively having the target logical address reference the single existing copy of the data as stored in the data block. As part of deduplication processing, the reference count associated with the single existing copy of the data block can be incremented as each additional reference to the same data block is made. In a similar manner, the reference count can be decremented as content of a particular logical address is modified or deleted to no longer be considered a duplicate of the single existing copy.

In some existing systems, updating MD such as the reference count can be performed by obtaining an exclusive lock or a write lock providing exclusive access to the MD page including the reference count and also updating the reference count atomically such as using an atomic read-modify-write operation in order to guarantee data consistency. In some applications, the same data or content can be written by multiple writes to many different logical addresses within a relatively short time period. Although deduplication processing can optimize and reduce non-volatile physical storage used to store the duplicate content that is written by the multiple writes, there is also additional contention when processing the multiple writes. In particular, there is additional contention to obtain exclusive access by acquiring the exclusive lock to the same MD page including the reference count that is updated with each additional reference to the same single copy of the written data. The foregoing can cause multiple deduplication transactions processing the multiple writes to queue and block waiting to acquire the same exclusive lock providing exclusive access to the same MD page with the reference count. As a result, the performance of the system can be adversely impacted. Additionally, the adverse impact can be greater, for example, if data deduplication is performed across multiple nodes of the same system where the lock access to the same MD page with the reference count is synchronized across the multiple nodes.

In at least one system, updates to the MD page can be stored in a log, where the logged update is persistently stored and where the logged updated is also stored in an in-memory log structure. In the in-memory log structure in at least one embodiment, each individual update to a particular MD page can be recorded as a separate entry in a bucket of updates associated with the particular MD page. Subsequently, the updates to the MD page as recorded in the log can be flushed and applied to a persistently stored copy of the MD page. Logging the MD updates such as to the reference count of the MD page can result in improved performance. However, when an update to the reference count of the MD page is recorded in the log, any cached copy of the MD page can be invalidated since the cached copy of the MD page is now considered stale and inconsistent with respect to the most current or updated version MD page. As a result, subsequent reads to read any field or item of the MD page can result in a cache miss and can result in subsequently reloading and reconstructing the most current or updated version of the MD page.

Accordingly, described in the following paragraphs are techniques of the present disclosure that can be performed to avoid invalidating the cached copy of the MD page as noted above. The techniques of the present disclosure can be used in connection with updates to the reference count as used in connection with deduplication as well as, more generally, other types of suitable updates. In at least one embodiment, rather than invalidate the cached copy of the MD page including the updated reference counter, the techniques of the present disclosure can be used in connection with updating the cached copy of the reference counter, and thus updating the cached copy of the MD page including the reference counter.

In accordance with the techniques of the present disclosure in at least one embodiment, the properties and use of the reference count can be such that a majority of the reads of the reference count of the MD page may not require an exact up to date value of the reference count. Rather, a majority of the use cases where the reference count is read may only need to know whether the reference count is zero or non-zero. In such an embodiment, the computation of the exact value of the reference count can be deferred and selectively performed when needed. In such an embodiment, threads or processes reading the reference count of the MD page may also not care about the order in which updates or writes are performed to the reference count. Rather, such threads or processes accessing the reference count for reading can generally want an accurate uncorrupted value of the reference count independent of the order in which updates are made to the reference count.

In at least one embodiment where threads or processes accessing the reference count of the MD page do not care about the order in which updates or writes are performed to the reference count, access to the cached copy of the MD page can be synchronized to allow a single writer to update the reference count of the cached MD page while concurrently allowing multiple readers to access the reference count of the cached MD page. In at least one such an embodiment, the foregoing access can be synchronized (e.g., to allow a single writer to access the cached MD page and also to concurrently allow multiple readers to access the cached MD page) using a shared or non-exclusive lock on the MD page in combination with a spinlock associated with the MD page. The non-exclusive lock on the MD page can generally allow multiple threads or processes to concurrently access the MD page as well as the cached MD page for reading. The non-exclusive lock on the MD page can be used to allow multiple threads concurrent read access to the MD page. Additionally, if a first of the multiple threads now wants to write or update the cached copy of the MD page, the first thread can be required to hold the non-exclusive lock on the MD page and also acquire and hold a dedicated spinlock associated with the cached copy of the MD page. In at least one embodiment, the spinlock can be a node-local spinlock for the MD page. In at least one embodiment, the spinlock can be a dedicated spinlock associated with the node-local cached copy of the MD page where, for example, the multiple readers and the single writer can execute on the same node having the dedicated spinlock associated with the cached copy of the MD page including the reference count. In at least one embodiment where the in-memory MD log includes a bucket of MD updates for the MD page and the bucket can be uniquely associated with the MD page, the spinlock can be a dedicated spinlock associated with the bucket including updates for the MD page. Thus, the first writer thread can hold a non-exclusive or shared lock on the MD page as well as the spinlock on the cached copy of the MD page while other reader threads hold the non-exclusive or shared lock on the MD page. The spinlock can be used to grant the first thread write access to the cached copy of the MD page, exclude other threads from writing to the cached copy of the MD page, and allow other threads holding the non-exclusive or shared lock read access to the cached copy of the MD page concurrent with the first writer thread updating the cached copy of the MD page. Thus the combination of the non-exclusive lock associated with the MD page and the spin lock associated with the cached copy of the MD page can allow for the single writer to have exclusive write access to the cached copy of the MD page while concurrently allowing the other multiple readers to have read access to the cached copy of the MD page. Using the combination of the shared or non-exclusive lock and the spinlock to concurrently allow a single writer and multiple readers to access the same cached copy of the MD page, the single writer can update the reference count of the cached copy of the MD page in a manner that provides for maintaining the data integrity of the reference count by excluding other writers and while simultaneously allowing for inconsistency between the cached value of the reference count and the most up to date version of the reference count (e.g., where the updates to the reference count are allowed to be performed in any order, thereby in an order independent manner, so long as the reference count value read is valid and uncorrupted). In such an embodiment, the spinlock provides the writer with exclusive write access to the reference count of the cached MD page while still concurrently allowing multiple readers read access to the reference count of the cached MD page.

In at least one embodiment, the reference count can be an integer value that can be 0 or more. In at least one embodiment, the reference count of the cached MD page can be stored in multiple cache lines. For example, in at least one embodiment, a cache line can be 64 bits in size and the reference count can have a size generally exceeding 64 bits and thus span two or more cache lines. In such an embodiment, use of atomic instructions can provide for updating only a single cache line atomically but cannot guarantee atomicity of updates made in the aggregate to the multiple cache lines of the reference count of the MD page. For example, assume a writer has updated only one of the cache lines of the reference count but has not yet updated the remaining one or more cache lines of the reference count. If a reader reads the value of the reference count as reflected across the multiple cache lines where only the first of the multiple cache lines has been updated, the reader can reads a corrupted and inaccurate value of the reference count since the multiple cache lines at the single point in time do not represent an accurate, valid, uncorrupted consistent representation of any value of the reference count with respect to the applied updates in any order. Generally, atomic instructions can be used to update a single one of the cache lines atomically (e.g., single read-modify-write performed atomically to update a single cache line) but cannot guarantee atomicity of update across the multiple cache lines.

In at least one embodiment, the techniques of the present disclosure provide for updating the multiple cache lines of the cached copy of the reference count in a defined sequence or order so as to guarantee that the reader will always read a non-zero value for the reference count under the assumption that the reference count has a non-zero value prior to performing the updating and a non-zero value after performing the updating. In this manner, the techniques of the present disclosure can be used to update the multiple cache lines of the reference count in a case where the reference count is a non-zero value both before and after the update. In at least one embodiment, the reference count can be initialized to 1 upon the first or initial reference to the associated data block, where the initialization can be performed by having a thread acquiring and holding an exclusive lock for the MD page to exclude all other access to the MD page and provide the thread with exclusive access to the MD page. Also generally, in other instances where a thread requires an exact value of the reference count and depends on the order in which updates applied the reference count, the thread can be required to first acquire and hold the exclusive lock for the MD page to exclude all other access to the MD page and provide the thread with exclusive access to the MD page. The techniques of the present disclosure can be used for updating the reference count of the cached MD page where threads reading the value of the reference count from the cached copy want the value to be valid, consistent (with respect to a single value stored in multiple cache lines) and uncorrupted but do not require an exact value of the reference count, do not care about the order in which updates are applied, and where the value of the reference count is non-zero both before and after the update. In such an embodiment in instances where the thread cares about the order in which reads and/or write accesses are performed for the reference count, and/or where the reference count has a zero value either before or after the update, it can be the responsibility of the thread performing the update or other operation to acquire and hold the exclusive lock providing the thread with exclusive access to the MD page (e.g., excluding both readers and writers from accessing the MD page while the thread holds the exclusive access such as through use of a write or exclusive lock on the MD page).

Thus in scenarios where the cached reference count is stored in multiple cache lines, accessed by threads that do not care about the order in which updates are applied to the cached reference count, and accessed by threads that want to read a cached value of the reference count that is valid, consistent (with respect to the multiple cache lines) and uncorrupted, the techniques of the present disclosure can be used to provide concurrent access of the cached reference count to multiple readers and a single writer which updates the cached reference count from a current non-zero value to an updated non-zero value (e.g., the cached reference count value is non-zero both before and after the update to performed by the single writer). In at least one embodiment, the techniques of the present disclosure can be used to update the cached reference count rather than invalidate a cached MD page including the reference count to thereby provide for maintaining an up to date version of the cached MD page including the reference count. As a result, the techniques of the present disclosure can provide for reducing the read cache miss rate with respect to the MD page including the reference count, increasing the read cache hit rate with respect to the MD page including the reference count, and generally increasing performance of the data storage system, or more generally, any system in which the techniques of the present disclosure are utilized.

The foregoing and other aspects of the techniques of the present disclosure are described in more detail in the following paragraphs.

For purposes of illustration of the techniques of the present disclosure and with reference to FIGS. 6 and 7A, assume that a write operation is performed that writes new data to a target address, and inline deduplication processing is performed for the write operation and determines that the new data is a duplicate of the contents stored in the data block 1362. In this case, deduplication processing includes associating the target address with the data block 1362 and also incrementing the reference count 1301*a* for the data block 1 1362 from 2 to 3. Assume further with reference to FIG. 7A that the MD update to the reference count 1301*a* of the entry 1357*a* of the VLB 1358 is represented as a tuple, where the tuple is stored as an entry in a corresponding bucket, such as the bucket 502*a*, in the active bucket set, such as the bucket set 502. Assume still further that the MD page that is updated, such as in this example the VLB page 1358, is stored in a cache, such as a node-local cache of the volatile memory 501. Still further, assume that the reference count has an associated storage size in terms of a number of bytes that is stored in two adjacent CPU cache lines (also referred to simply as cache lines) of the cached MD page 1358. Consistent with discussion above, the techniques of the present disclosure described in the following paragraphs can be used to update the reference count 1301*a* from 2 to 3 in the cached copy of the MD page 1358 while also concurrently allowing one or more readers access to the cached copy of the reference count 1301*a* while a writer is updating the cached copy of the reference count 1301*a*.

Figure 7B:
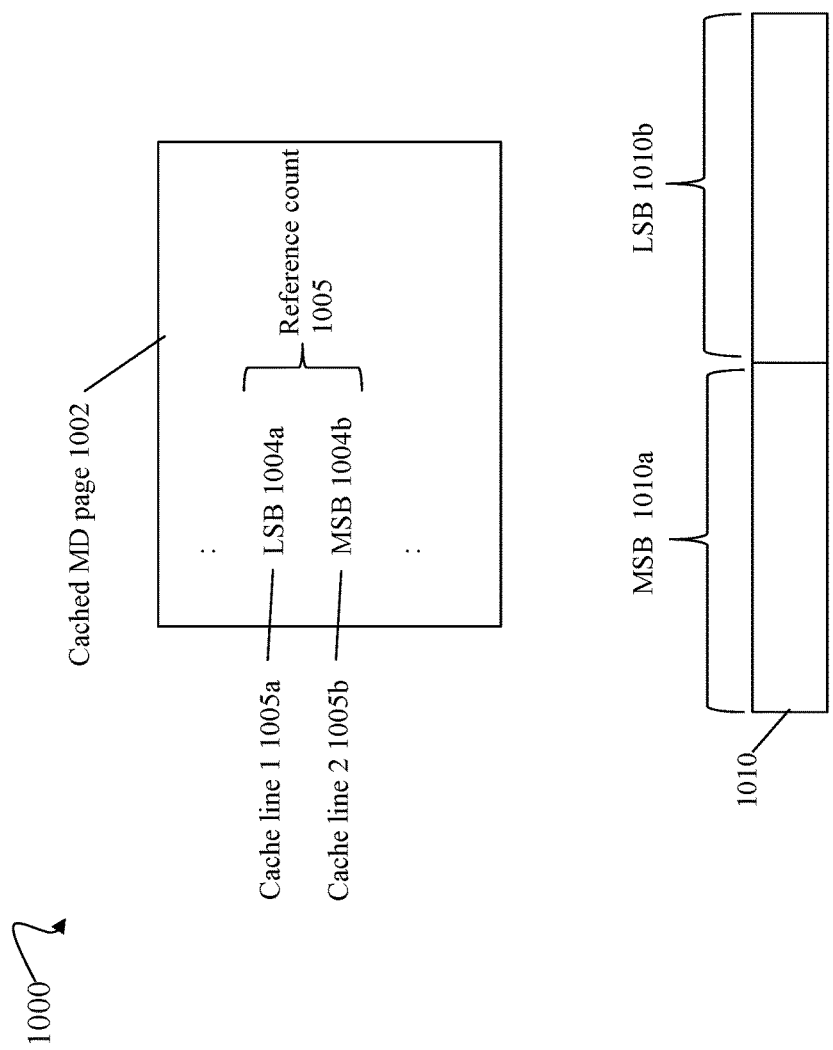
FIG. 7B is an example of a cached metadata page in at least one embodiment in accordance with the techniques of the present disclosure.

Referring to FIG. 7B, shown is an example of a cached MD page and associated fields in at least one embodiment in accordance with the techniques of the present disclosure.

The example 1000 includes a representation of the cache MD page 1002 which can include the fields 1004*a*, 1004*b* that collectively represent the reference count being incremented from 2 to 3. In particular, the field 1004*a* can represent the least significant bits (LSB) of the reference count 1005 where the LSB 1004a is stored in the cache line 1 1005a; and the field 1004b can represent the most significant bits (MSB) of the reference count 1005 where the MSB 1004b is stored in the cache line 2 1005b. In this example, the fields 1004a and 1004b can be adjacent and also cacheline aligned. However, more generally, the techniques of the present disclosure can be used in connection with a data item stored in the cache where the data item can generally be stored in 2 cache lines. Additionally and more generally, the cache lines collectively including the cached data item do not have to be adjacent and can be of any size for use with the techniques of the present disclosure.

The element 1010 represents the layout of the LSB 1010b and MSB 1010a portions of the reference counter 1010. In other words, the data from the cache lines 1005a-b can be appended as represented in 1010 to obtain the data layout of the reference counter spanning the cache lines 1005a-b in this example.

As noted above, assume the current value of the reference counter 1005 is 2, or more generally an integer greater than 0 and that reference counter 1005 is being incremented by 1, so that the value of the current value or prior value of reference counter 1005 before updating is greater than 0, and also the updated value of the reference counter 1005 after incrementing or updating is greater than 0. In this case, at least one of the LSB 1004a and MSB 1004b located respectively in the cache lines 1005a-b before updating is non-zero. Furthermore, after updating, at least one of the LSB 1004a and MSB 1004b is non-zero.

Figure 7C:
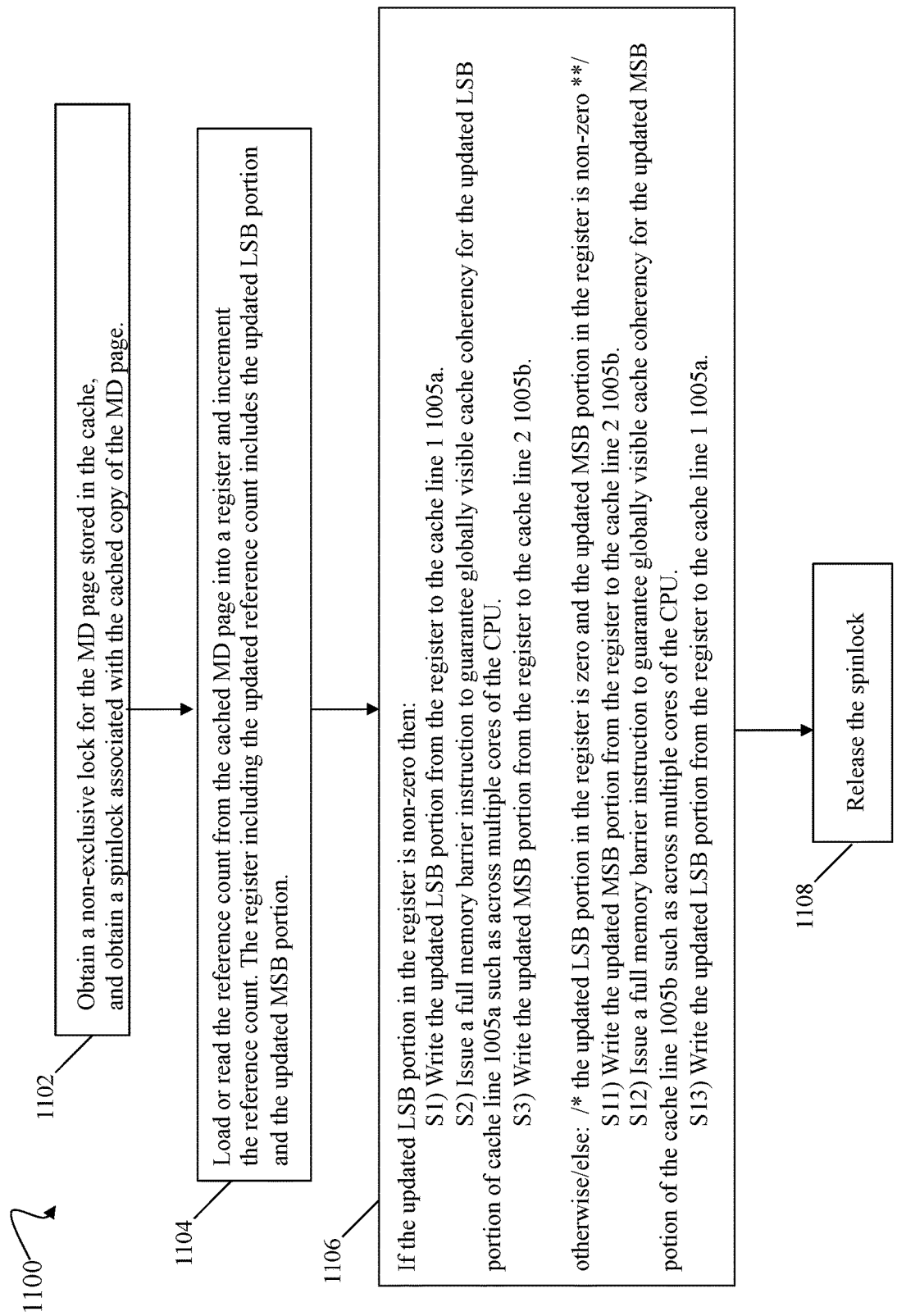

Referring to FIG. 7C, shown is a flowchart 1100 of processing that can be performed in at least one embodiment in accordance with the techniques of the present disclosure. The steps of the flowchart 1100 can be performed by a writer, such as a thread or process, that updates the reference count of the cached MD page.

At a step 1102, the writer acquires a non-exclusive or shared lock on the MD page stored in the cache. In at least one embodiment with two nodes in the system, the non-exclusive lock status on the MD page can be synchronized across both nodes so that, for example, no other thread or process can acquire an exclusive lock on the MD page while any thread or process holds a non-shared lock on the MD page. Additionally, no thread or process can acquire the exclusive lock on the MD page if any other thread or process holds a non-exclusive or shared lock on the MD page. Additionally, the writer can obtain a spinlock associated with the cached copy of the MD page stored in the cache. The spinlock can be used to prevent concurrent updates to the cached MD page. In at least one embodiment, the spinlock can be a dedicated spinlock associated with the MD page stored in the cache, or a spinlock associated with the cached copy of the MD page. As another example, the spinlock in at least one embodiment can be associated with the bucket of the in-memory MD log (e.g., such as associated with the bucket 502a including the MD updates for the VLB page 1358 as noted above. More generally, the spinlock can be any suitable dedicated spinlock associated with the cached copy of the MD page stored in the cache. From the step 1102, control proceeds to the step 1104.

At the step 1104, processing is performed to load or read the reference count from the cached MD page into a register and then increment the reference count as stored in the register. In this case, after incrementing the reference count, the register can include the updated reference count. The register including the updated reference count can include the updated LSB portion and the updated MSB portion. In this example, the register can be of a suitable size to accommodate storing and performing operations on both the LSB and MSB portions of the reference count stored in the two cache lines 1005a-b. From the step 1104, control proceed to the step 1106.

At the step 1106, a determination can be made regarding whether the updated LSB portion as included in the register is non-zero. If so, then the following steps can be performed in sequential order:

S1) Write the updated LSB portion from the register to the cache line 1 1005a.

S2) Issue a full memory barrier instruction to guarantee globally visible cache coherency for the updated LSB portion of the cache line 1005a such as across multiple cores of the CPU.

S3) Write the updated MSB portion from the register to the cache line 2 1005b.

As also included in the step 1106, otherwise, if it is determined that the updated LSB portion as stored in the register is not non-zero, it means that that the updated LSB portion of the register is zero and the updated MSB portion of the register is non-zero. If the updated LSB portion of the register is zero and the updated MSB portion of the register is non-zero, the following steps can be performed in sequential order:

S11) Write the updated MSB portion from the register to the cache line 2 1005b.

S12) Issue a full memory barrier instruction to guarantee globally visible cache coherency for the updated MSB portion of the cache line 1005b such as across multiple cores of the CPU.

S13) Write the updated LSB portion from the register to the cache line 1 1005a.

At any point in the update flow of the step 1106, a reader reading the reference count as stored in the cache lines 1005a-b is guaranteed to consistently read a non-zero reference count. Generally in at least one embodiment as explained above the reader only wants to know whether the reference count value is zero or non-zero. Thus a reader, such as one holding the non-exclusive or shared lock on the MD page being updated, can consistently read a non-zero reference count from the cached MD page while the update to the reference count as stored in the cache lines 1005a-b of the cached MD page 1002 is in progress and has not yet completed. From the step 1106, control proceeds to the step 1108 where the spinlock (obtained in the step 1102) can be released.

Generally, full memory barrier instructions as noted in connection with the steps S2 and S5 are known in the art and particular to the CPU instruction set used in an embodiment. Generally, the full memory barrier instruction performs a serializing of all load instructions (e.g., load from memory) and store instructions (e.g., store to memory) instructions issued prior to the full memory barrier instruction. This serializing operation guarantees that every load and store instruction that precedes the full memory barrier instruction in program order becomes globally visible before any load or store instruction that follows the full memory barrier instruction. For example, the full memory barrier instruction of the step S2 guarantees that any read of the reference count from the cached page that is performed or executed after S2 reads the new or updated LSB portion of the reference count, where the new or updated LSB portion is non-zero. In this case, it is guaranteed that the reader reading the reference count after the step S2 always reads a non-zero value for the updated reference counter including the updated LSB and updated MSB portions. In a similar manner, the full memory barrier instruction of the step S12 guarantees that any read of the reference count from the cached page that is performed or executed after S12 reads the new or updated MSB portion of the reference count, where the new or updated MSB portion is non-zero. In this case, it is guaranteed that the reader reading the reference count after the step S12 always reads a non-zero value for the updated reference counter including the updated LSB and updated MSB portions.

It should be noted that generally, at any point in the update flow of the step 1106 to update the cached reference counter of the cache lines 1105*a-b*, the reader is guaranteed to read a non-zero value for the updated reference count.

Consider first the steps S1-S3 performed when the updated LSB portion is non-zero. Note that the step S1-S3 can be performed when the updated LSB portion is non-zero and the updated MSB portion is either zero or non-zero.

Consider the step S1 that writes the updated LSB portion from the register to the cache line 1 1005*a*. If a reader reads the cached reference counter after the step S1 is executed but prior to executing S2, there is no guarantee the reader will read the updated LSB portion of the reference counter as stored in the cache. It may be that due to timing, the updated LSB portion is not yet visible or exposed globally to the reader. In this case, the reader may read either: the prior reference count value of 2 (e.g., both the prior LSB portion and the prior MSB portion); or a reference count including the prior MSB portion and updated LSB portion. In either case, the reader obtains a non-zero value for the reference count which is a combination of LSB and MSB portions.

Consider the step S2 as discussed above. If a reader reads the cached reference counter after the step S2 is updated but prior to the step S3, the reader obtains a non-zero value for the reference count which is a combination the non-zero updated LSB portion and the prior MSB portion (which can be either zero or non-zero).

Consider the step S3 that writes the updated MSB portion from the register to the cache line 2 1005*b*. If a reader reads the cached reference counter after the step S3 is executed, there is no guarantee the reader will read the updated reference counter including the updated MSB portion. It may be that due to timing, the updated MSB portion is not yet visible or exposed globally to the reader. In this case, the reader may read either: a reference count with the updated LSB portion and the prior MSB portion; or a reference count including the updated MSB portion and updated LSB portion. In either case, the reader obtains a non-zero value for the reference count which is a combination of LSB and MSB portions.

Consider the steps S11-S13 performed when the updated MSB portion is non-zero and the LSB portion is zero.

Consider the step S11 that writes the updated MSB portion from the register to the cache line 2 1005*b*. If a reader reads the cached reference counter after the step S11 is executed but prior to executing S12, there is no guarantee the reader will read the updated MSB portion of the reference counter as stored in the cache. It may be that due to timing, the updated MSB portion is not yet visible or exposed globally to the reader. In this case, the reader may read either: the prior reference count value of 2 (e.g., both the prior LSB portion and the prior MSB portion); or a reference count including the prior LSB portion and updated MSB portion. In either case, the reader obtains a non-zero value for the reference count which is a combination of LSB and MSB portions.

Consider the step S12 as discussed above. If a reader reads the cached reference counter after the step S12 is updated but prior to the step S13, the reader obtains a non-zero value for the reference count which is a combination the non-zero updated MSB portion and the prior LSB portion (which can be either zero or non-zero).

Consider the step S13 that writes the updated LSB portion from the register to the cache line 1 1005*a*. If a reader reads the cached reference counter after the step S13 is executed, there is no guarantee the reader will read the updated LSB portion of the reference counter as stored in the cache. It may be that due to timing, the updated LSB portion is not yet visible or exposed globally to the reader. In this case, the reader may read either: a reference count with the updated MSB portion and the prior LSB portion; or a reference count including the updated MSB portion and updated LSB portion. In either case, the reader obtains a non-zero value for the reference count which is a combination of LSB and MSB portions.

In this manner, it is a logical invariant at any point in the update flow processing of the step 1106 that a reader reads a non-zero value for the cached reference count of the cached MD page including the reference count.

Generally, the processing of the flowchart 1100 provides for determining whether the updated LSB portion of the reference counter (e.g., as stored in the register) is non-zero. Responsive to determining that the updated LSB portion of the reference counter is non-zero, updating the cache line 1005*a* including the LSB portion of the cached reference count before updating the cache line 1005*b* including the MSB portion of the cached reference count. Otherwise, the updated MS portion of the reference count is non-zero and the cache line 1005*b* including the MSB portion of the cached reference count is updated prior to updating the cache line 1005*a* including the LSB portion of the cached reference count.

As a variation to the step 1106, processing can be performed to examine the current cache lines 1005*a-b* including the current or prior values of the LSB and MSB portions prior to updating. In this case, generally, processing of the step 1106 can be restated with conditional logical in an alternative way using the current or prior LSB and MSB portions as stored in the cache lines 1005*a-b* before updating to determine whether to update the cache line 1005*a* (containing the LSB portion) or 1005*b* (containing the MSB portion) first. In this case, processing can always first update the one of the LSB cache line 1005*a* or the MSB cache line 1005*b* that is zero, if either 1005*a* or 1005*b* is zero. Also if both the cache lines containing the current or prior values for the MSB and LSB portion prior to updating are non-zero, then either 1005*a* or 1005*b* can be updated first (e.g., order does not matter). In this case, rather than perform the step 1106 with the conditional logical as stated in the FIG. 7C and described above, the step 1106 can rather be generally stated as: If the current or prior LSB portion (before update) as stored in the LSB cache line 1005*a* is zero, then the current or prior MSB portion as stored in the MSB cache line 1005*b* prior to update is non-zero and processing updates the LSB cache line 1005*a* before updating the MSB cache line 1005*b*. Otherwise, the LSB cache line 1005*a* including the current or prior LSB portion before updating is non-zero and processing updates the MSB cache line 1005*b* before updating the LSB cache line 1005*a*.

With reference to FIG. 7D, shown is processing of the step 1206 that can be performed as alternative to the step 1106 in connection with the flowchart 1100 of FIG. 7C. The step 1206 is consistent with the alternative conditional logic noted above. At the step 1206, if the current or prior LSB portion as stored in the cache line 1005*a* prior to update is zero, then perform the steps S1-S3 in sequential order as discussed above in connection with the step 1106; and otherwise/else, perform the steps S11-S13 in sequential order as discussed above in connection with the step 1106. In at least one embodiment, a reader acquiring a shared lock to the MD page having the reference count of its cached copy updated in the connection with FIG. 7C processing can concurrently read from the MD page, and can in particular, read from the cached reference counter from the cached copy of the MD page.

In this manner, processing can be performed by a node to update a cached reference count included in a cached MD page rather than invalidate the cached copy of the MD page. In at least one embodiment including two nodes in a single appliance or system, both nodes can generally perform the processing of FIG. 7C to update their respective cached copy, if any, of the MD page. It may be that one node includes a cached copy of the MD page in its node-local cache but the other peer node does not include a copy of the MD page in its node-local cache. In this case in at least one embodiment, only the node that includes a cached copy of the MD page needs to update the cached reference count of the cached MD page.

In this manner, the techniques of the present disclosure can control and conditionally vary the order in which the two cache lines 1005a-b for the LSB and MSB portions of the reference count are updated so that a reader, at any point in the update processing flow to update the two cache lines 1005a-b, will read a non-zero reference count based on the combination of the LSB and MSB cache lines 1005a-b. The techniques of the present disclosure as discussed above are applicable when the current or prior value of the reference count before updating is non-zero which is incremented from a first non-zero value to a second non-zero value. More generally, the techniques of the present disclosure can be used to update the reference count or any other data item denoting an integer value that is generally updated from one non-zero value to another non-zero value. In other words, the techniques of the present disclosure can be used when incrementing the reference count by 1 but can also be used in connection with other updating operations that generally update the reference count from a first non-zero value to a second non-zero value. For example, the techniques of the present disclosure can be used when incrementing the reference count by 1 or more, and also when decrementing the reference count by 1 or more so long as the reference count value both before and after updating is non-zero.

In at least one embodiment, rather than increment a reference count from 0 to 1 such as when there is an initial or first reference to a data block, the reference count can be generally included in a structure that is allocated and initialized to 1. More generally, in at least one embodiment when incrementing a reference count from 0 to 1, a processing flow can be performed which utilizes an exclusive write lock on the MD page including the reference count.

In at least one embodiment, the techniques of the present disclosure can be used to more generally update multiple cache lines including multiple data items which do not require strong ordering of reads and/or writes such as in cases where it is not important whether the read reads an updated or prior value. In some use cases, it may further be required that updates to the multiple data items performed by the writer be performed atomically where either all the updates are performed, or none of the updates are performed. Additionally, it may further be required that reading of multiple data items be performed atomically to ensure that no writer has modified some of the data items providing a reader with an inconsistent view of the updated data items.

Figure 8:
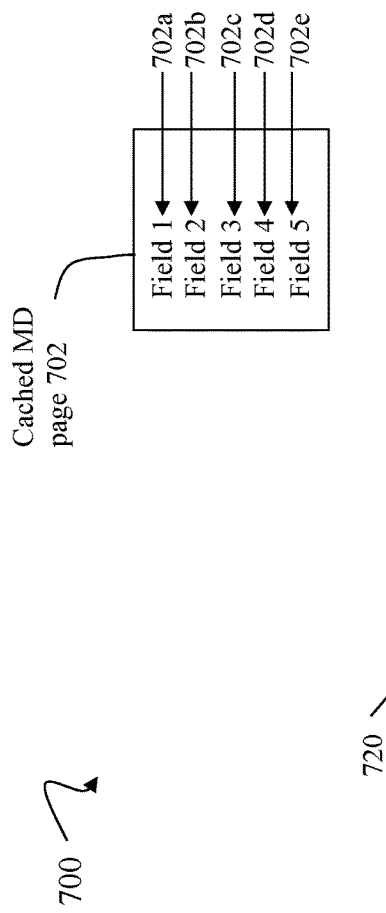
FIG. 8 illustrates a cached metadata page and associated processing that can be performed in at least one embodiment accordance with the techniques of the present disclosure.

For example, with reference to the example 700 of FIG. 8, consider a cached MD page 702 with the 5 fields or data items 702a-e. Assume that each of the fields 702a-e is stored in a different cache line of the cache. Assume that a writer wants to update the fields 1, 3, 5 respectively, denoted by the elements 702a, c and e. In this case, the writer can perform processing as illustrated in the element 720 of FIG. 8. In the step 722, the writer can acquire a non-exclusive or shared lock for the MD page stored in the cache and also acquire a spinlock for the cached copy of the MD page stored in the cache prior to updating the cache lines including the fields 1, 3 and 5, respectively, denoted by the elements 702a, c and e. The spinlock can provide the writer with exclusive access to the cached copy of the MD page 702 stored in the cache. From the step 722, the writer can perform the step 724 to update the cache lines including the fields 1, 3 and 5 respectively, denoted by the elements 702a, c and e. From the step 724, the writer can perform the step 726 to release the spinlock for the MD page 702 stored in the cache.

Additionally, assume a reader can either read the values of all the fields 1, 3 and 5 prior to the update by the writer, or else the reader can read the updated values of all the fields 1, 3, and 5 after the writer has updated all the fields 1, 3, 5. However, the reader should not be able to read a partially updated portion of less than all the fields 1, 3 and 5. In this case, the reader can be prohibited from directly reading the cached MD page 702 directly from the cache. Rather, the reader can invoke an API, such as API_GET_MD FIELD ( ) to read the fields 1, 3, 5. In at least one embodiment, the reader can specify the fields 1, 3 and 5 as inputs in the API call. The body of code of the API can perform processing as illustrated the element 740 of FIG. 8. The reader can invoke the API having the body of code performing the processing illustrated by the element 740. For example, the API call by the reader can identify the fields 1, 3 and 5 as the desired fields to be read from the cached MD page 702. In this case, the code of the API can perform the step 742 to acquire a non-exclusive or shared lock for the MD page stored in the cache and also acquire a spinlock for the cached copy of the MD page stored in the cache. The spinlock can provide the API with exclusive access to the MD page 702 stored in the cache. From the step 742, the API code can perform the step 744. At the step 744, the API code can copy the content of the cache lines including the fields 1, 3 and 5 respectively, denoted by the elements 702a, c and e, to a temporary (temp) buffer in user memory. From the step 744, the API code can perform the step 746 where the spinlock is released. From the step 746, the API code can perform the step 748 where the temp buffer including the requested desired data items 1, 3 and 5 are returned to the reader that performed the API call.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:
acquiring a spinlock on a cached copy of a metadata (MD) page stored in a cache, wherein the spinlock prevents concurrent updates of the cached copy of the MD page of the cache, wherein the cached copy of the MD page includes a field stored in two cache lines of the cache;
loading a current value of the field of the cached copy of the MD page from the two cache lines to a register;
updating the register to include an updated value of the field, wherein a first portion of the register corresponds to a first portion of the updated value of the field and a second portion of the register corresponds to a second portion of the updated value of the field;
determining whether the first portion of the updated value of the field as stored in the register is non-zero, wherein the first portion of the updated value of the field as stored in the register corresponds to a first of the two cache lines; and
responsive to determining that the first portion of the updated value of the field as stored in the register is non-zero, performing first processing that updates a cached copy of the field as stored in the two cache lines of the cache, the first processing further including:
storing the first portion of the updated value of the field from the register in the first cache line; and
subsequent to performing said storing the first portion of the first processing, storing the second portion of the updated value of the field as stored in the register in the second cache line.

2. The computer-implemented method of claim 1, wherein the first processing further includes:
issuing a full memory barrier instruction after said storing the first portion of the updated value of the field from the register in the first cache line, and prior to said storing the second portion of the updated value of the field as stored in the register in the second cache line.

3. The computer-implemented method of claim 2, wherein the full memory barrier instruction guarantees that the first portion of the updated value of the field stored in the first cache line is globally visible and coherent to a reader that reads the first cache line after the full memory barrier instruction is executed.

4. The computer-implemented method of claim 1, further comprising:
responsive to determining that the first portion of the updated value of the field as stored in the register is not non-zero thereby indicating the first portion of the updated value of the field as stored in the register is zero, performing second processing that updates the cached copy of the field as stored in the two cache lines of the cache, the second processing including:
storing the second portion of the updated value of the field from the register in the second cache line; and
subsequent to performing said storing the second portion of the second processing, storing the first portion of the updated value of the field as stored in the register in the first cache line.

5. The computer-implemented method of claim 4, wherein the second processing further includes:
issuing a full memory barrier instruction after said storing the second portion in said second processing and prior to storing the first portion in said second processing.

6. The computer-implemented method of claim 5, wherein the full memory barrier instruction guarantees that the second portion of the updated value of the field stored in the second cache line is globally visible and coherent to a reader that reads the second cache line after the full memory barrier instruction is executed.

7. The computer-implemented method of claim 4, further comprising:
synchronizing access to the cached copy of the MD page stored in a cache, wherein said synchronizing includes allowing a writer to update the cached copy of the MD page stored in the cache while concurrently allowing one or more readers access to read from the cached copy of the MD page stored in the cache, and wherein said synchronizing includes the writer performing said acquiring the spinlock, and wherein said writer performs said loading, said updating the register, said determining, said first processing, and said second processing.

8. The computer-implemented method of claim 1, wherein the field is a reference count denoting a number of references to a data block.

9. The computer-implemented method of claim 8, further comprising:
receiving a write operation that writes new data to a target logical address; and
performing deduplication processing comprising:
determining that the new data is a duplicate of content current stored in the data block;
incrementing the reference count associated with the data block; and
associating the target logical address with the data block so that the target logical address references the data block.

10. The computer-implemented method of claim 9, wherein said incrementing increments the reference count to the updated value.

11. The computer-implemented method of claim 1, wherein the computer-implemented method includes performing update processing that updates the cached copy of the field as stored in the two cache lines of the cache to the updated value, wherein said update processing includes performing the first processing, and wherein prior to performing said update processing that updates the cached copy of the field stored in the two cache lines of the cache to the updated value, at least one of the plurality of cache lines corresponding to the cached copy of the field prior to said update processing is non-zero.

12. The computer-implemented method of claim 11, wherein after performing said update processing that updates the cached copy of the field as stored in the two cache lines of the cache to the updated value, at least one of the plurality of cache lines of the corresponding cached copy of the field is non-zero.

13. The computer-implemented method of claim 1, further comprising:
each of the one or more readers acquiring a non-exclusive lock on the MD page stored in the cache; and
subsequent to said each reader acquiring the non-exclusive lock on the MD page, said each reader reading the field from the two cache lines of the cached copy of the MD page, wherein said reading is performed while said update processing is updating the cached copy of the field, as stored in the two cache lines of the cache, to the updated value.

14. A system comprising:
one or more processors; and one or more memories comprising code stored thereon that, when executed, performs a method of comprising:
  acquiring a spinlock on a cached copy of a metadata (MD) page stored in a cache, wherein the spinlock prevents concurrent updates of the cached copy of the MD page of the cache, wherein the cached copy of the MD page includes a field stored in two cache lines of the cache;
  loading a current value of the field of the cached copy of the MD page from the two cache lines to a register;
  updating the register to include an updated value of the field, wherein a first portion of the register corresponds to a first portion of the updated value of the field and a second portion of the register corresponds to a second portion of the updated value of the field;
  determining whether the first portion of the updated value of the field as stored in the register is non-zero, wherein the first portion of the updated value of the field as stored in the register corresponds to a first of the two cache lines; and
  responsive to determining that the first portion of the updated value of the field as stored in the register is non-zero, performing first processing that updates a cached copy of the field as stored in the two cache lines of the cache, the first processing further including:
    storing the first portion of the updated value of the field from the register in the first cache line; and
    subsequent to performing said storing the first portion of the first processing, storing the second portion of the updated value of the field as stored in the register in the second cache line.

15. A non-transitory computer readable medium comprising code stored thereon that, when executed, performs a method comprising:
  acquiring a spinlock on a cached copy of a metadata (MD) page stored in a cache, wherein the spinlock prevents concurrent updates of the cached copy of the MD page of the cache, wherein the cached copy of the MD page includes a field stored in two cache lines of the cache;
  loading a current value of the field of the cached copy of the MD page from the two cache lines to a register;
  updating the register to include an updated value of the field, wherein a first portion of the register corresponds to a first portion of the updated value of the field and a second portion of the register corresponds to a second portion of the updated value of the field;
  determining whether the first portion of the updated value of the field as stored in the register is non-zero, wherein the first portion of the updated value of the field as stored in the register corresponds to a first of the two cache lines; and
  responsive to determining that the first portion of the updated value of the field as stored in the register is non-zero, performing first processing that updates a cached copy of the field as stored in the two cache lines of the cache, the first processing further including:
    storing the first portion of the updated value of the field from the register in the first cache line; and
    subsequent to performing said storing the first portion of the first processing, storing the second portion of the updated value of the field as stored in the register in the second cache line.

16. The non-transitory computer readable medium of claim 15, wherein the first processing further includes:
  issuing a full memory barrier instruction after said storing the first portion of the updated value of the field from the register in the first cache line, and prior to said storing the second portion of the updated value of the field as stored in the register in the second cache line.

17. The non-transitory computer readable medium of claim 16, wherein the full memory barrier instruction guarantees that the first portion of the updated value of the field stored in the first cache line is globally visible and coherent to a reader that reads the first cache line after the full memory barrier instruction is executed.

18. The non-transitory computer readable medium of claim 15, wherein the method further comprises:
  responsive to determining that the first portion of the updated value of the field as stored in the register is not non-zero thereby indicating the first portion of the updated value of the field as stored in the register is zero, performing second processing that updates the cached copy of the field as stored in the two cache lines of the cache, the second processing including:
    storing the second portion of the updated value of the field from the register in the second cache line; and
    subsequent to performing said storing the second portion of the second processing, storing the first portion of the updated value of the field as stored in the register in the first cache line.

19. The non-transitory computer readable medium of claim 18, wherein the second processing further includes:
  issuing a full memory barrier instruction after said storing the second portion in said second processing and prior to storing the first portion in said second processing.

20. The non-transitory computer readable medium of claim 19, wherein the full memory barrier instruction guarantees that the second portion of the updated value of the field stored in the second cache line is globally visible and coherent to a reader that reads the second cache line after the full memory barrier instruction is executed.

* * * * *